(12) United States Patent
Biwa

(10) Patent No.: US 9,846,303 B2
(45) Date of Patent: Dec. 19, 2017

(54) DISPLAY SYSTEM HAVING DISPLAY DEVICE AND SENSOR ON SUBSTRATE

(71) Applicant: Sony Corporation, Tokyo (JP)

(72) Inventor: Goshi Biwa, Kanagawa (JP)

(73) Assignee: Sony Corporation, Tokyo (JP)

(*) Notice: Subject to any disclaimer, the term of this patent is extended or adjusted under 35 U.S.C. 154(b) by 46 days.

(21) Appl. No.: 14/315,386

(22) Filed: Jun. 26, 2014

(65) Prior Publication Data

US 2015/0009101 A1    Jan. 8, 2015

(30) Foreign Application Priority Data

Jul. 3, 2013   (JP) ................................. 2013-139503

(51) Int. Cl.
*G02B 27/01*   (2006.01)

(52) U.S. Cl.
CPC ...... *G02B 27/017* (2013.01); *G02B 2027/014* (2013.01); *G02B 2027/0127* (2013.01)

(58) Field of Classification Search
CPC .............. G02B 27/017; G02B 27/0179; G02B 27/0181
USPC ......................................................... 345/7–9
See application file for complete search history.

(56) References Cited

U.S. PATENT DOCUMENTS

| 6,191,892 B1* | 2/2001 | Isaka ................... G02B 27/017 |
| | | 359/630 |
| 2005/0195129 A1* | 9/2005 | Yamazaki ........... G02B 27/017 |
| | | 345/8 |
| 2007/0291325 A1* | 12/2007 | Toyota .................. G06F 3/0412 |
| | | 358/474 |
| 2013/0278631 A1* | 10/2013 | Border ................ G02B 27/017 |
| | | 345/633 |
| 2013/0300635 A1* | 11/2013 | White ................ H04N 13/0484 |
| | | 345/7 |

FOREIGN PATENT DOCUMENTS

| JP | 2010-073841 | 4/2010 |
| JP | 2010-139901 | 6/2010 |

* cited by examiner

*Primary Examiner* — Lisa Landis
(74) *Attorney, Agent, or Firm* — Wolf, Greenfield & Sacks, P.C.

(57) ABSTRACT

A head-mounted display system comprises a frame, an imaging system and an optical system. The frame is configured to be mounted to a head of a user. The imaging system is configured to couple to the frame, and includes one or more display devices disposed on a substrate and one or more sensors disposed on the substrate. The optical system is configured to provide an optical path between an eye of the user and the one or more sensors, and configured to provide the same optical path between the eye of the user and the one or more display devices.

16 Claims, 20 Drawing Sheets

FIG. 2A
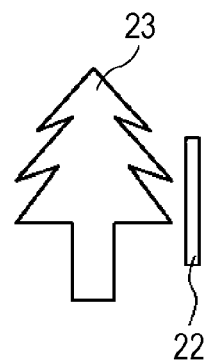
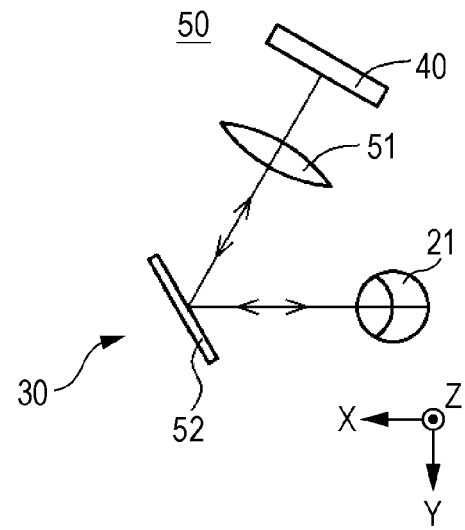
FIG. 2B
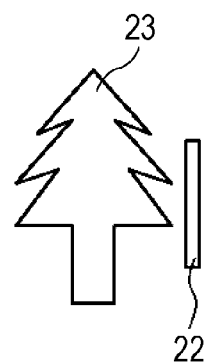
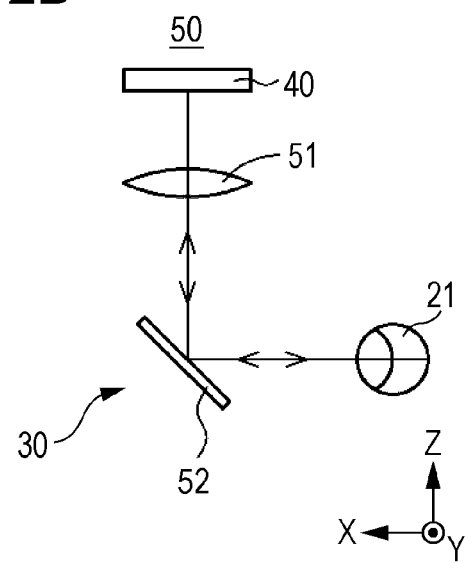

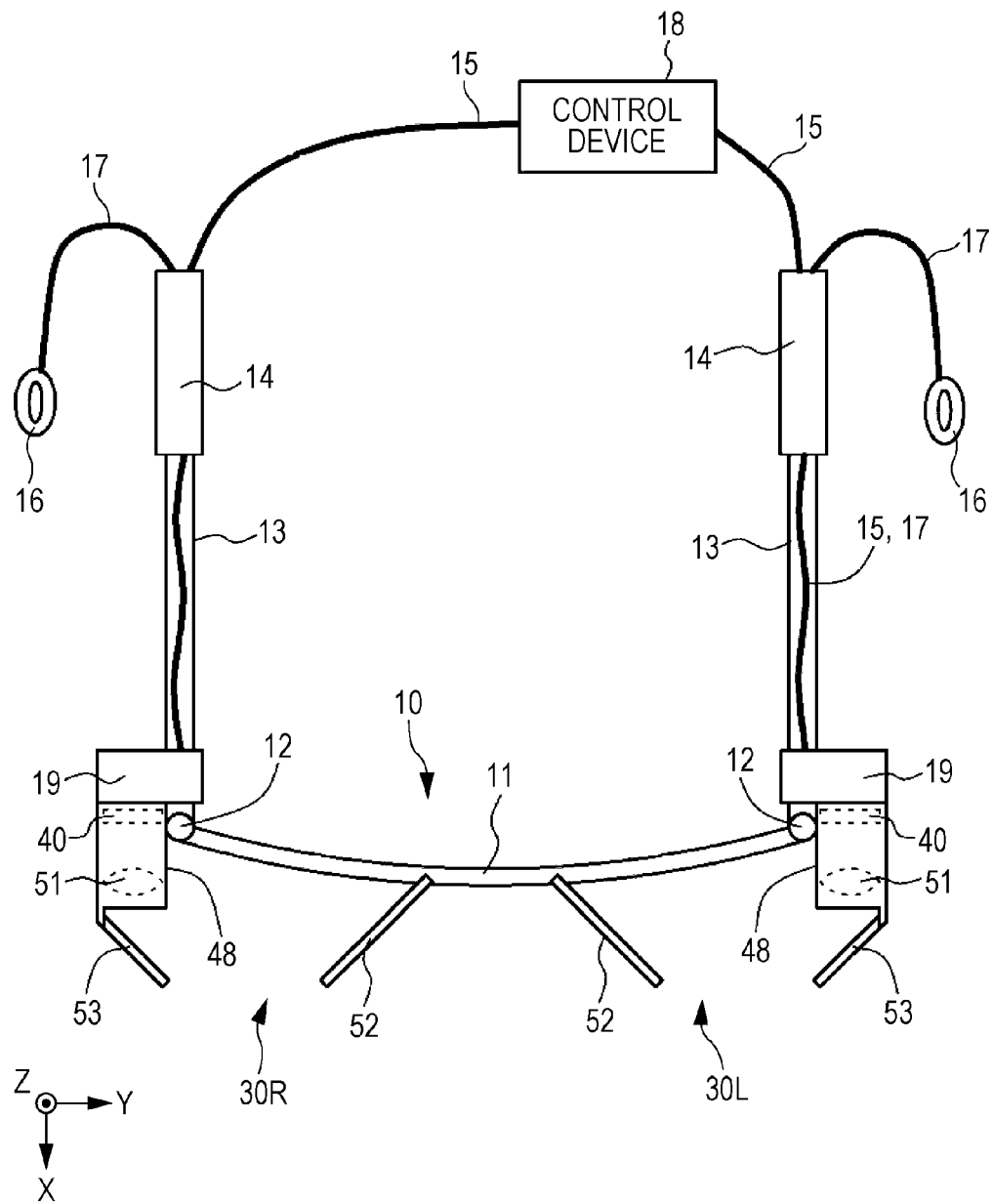

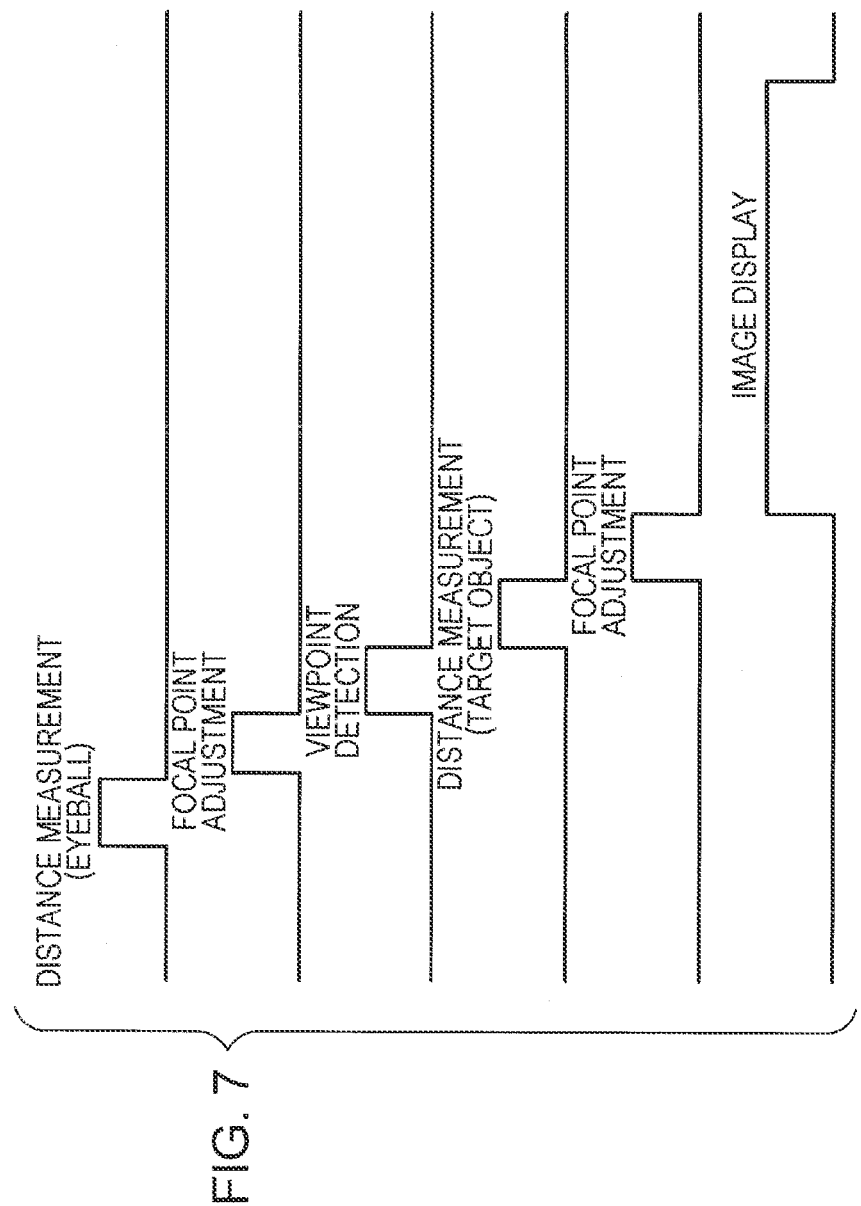

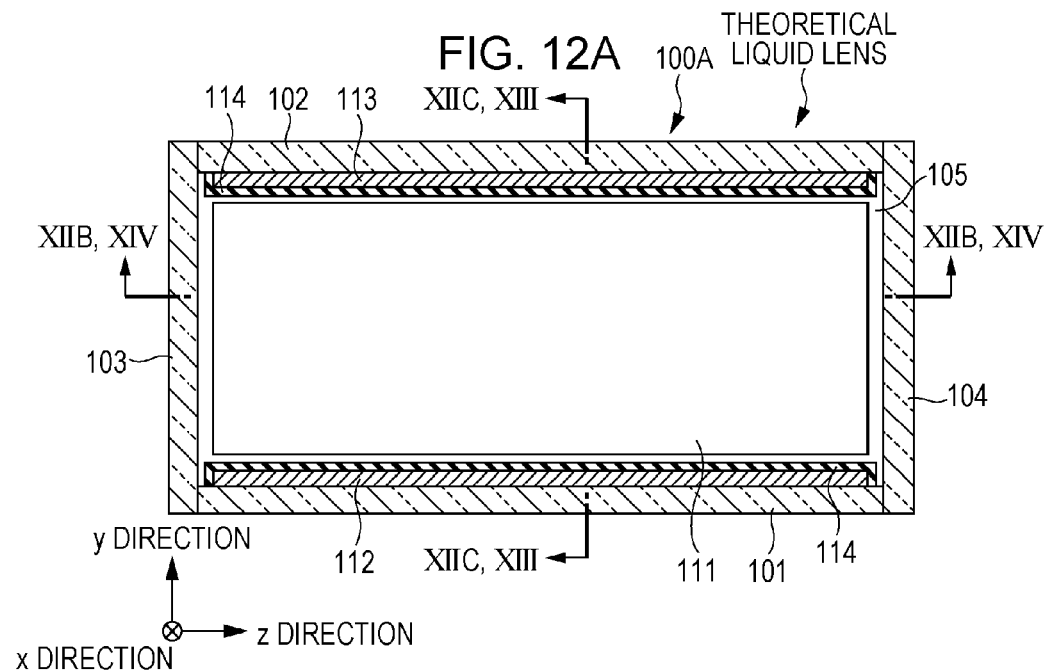
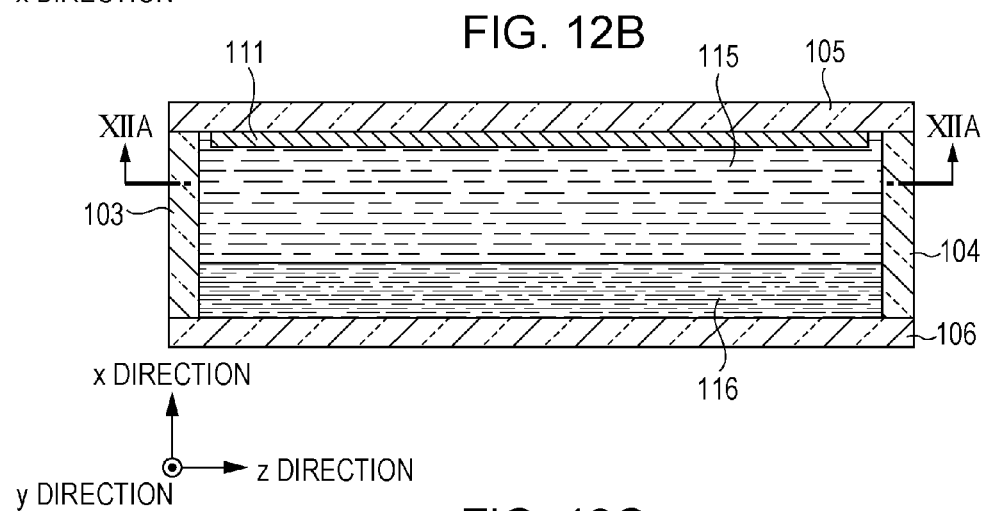
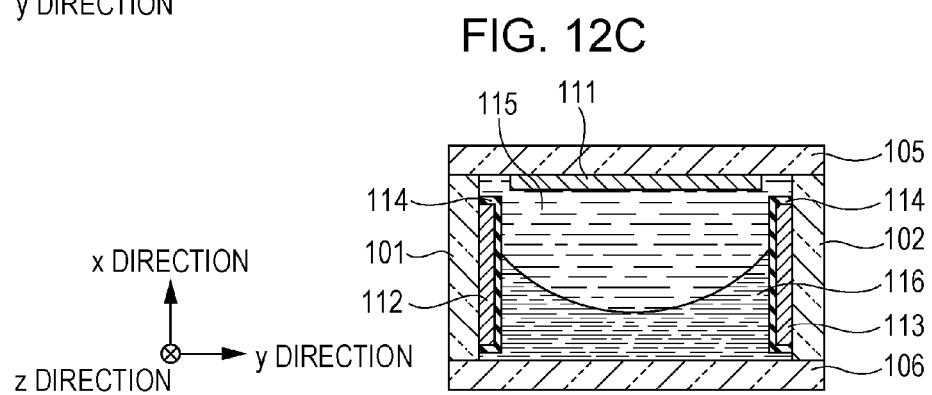

DISPLAY SYSTEM HAVING DISPLAY DEVICE AND SENSOR ON SUBSTRATE

CROSS REFERENCE TO RELATED APPLICATIONS

This application claims the benefit of Japanese Priority Patent Application JP 2013-139503 filed Jul. 3, 2013, the entire contents of which are incorporated herein by reference to the extent permitted by applicable law.

BACKGROUND

The present disclosure relates to a display apparatus. More specifically, the present disclosure relates to a display apparatus that is suitable for use in a Head Mounted Display (HMD), for example.

For example, in the related art disclosed in Japanese Unexamined Patent Application Publication No. 2010-139901, there is a head mounted display for allowing an observer to observe a two-dimensional image, which is formed by an image forming device, as an enlarged virtual image using a virtual image optical system. The head mounted display that is disclosed in the Japanese Unexamined Patent Application is provided with a CCD camera that functions as a distance detecting unit, which detects a distance to an external target object. Furthermore, the head mounted display is provided with a depth position adjustment unit that adjusts the display position in the depth direction of the image based on the distance that is detected using the distance detecting unit.

SUMMARY

According to an aspect of the present disclosure, a head-mounted display system is provided, comprising: a frame configured to be mounted to a head of a user; an imaging system configured to couple to the frame, the imaging system including: one or more display devices disposed on a substrate, and one or more sensors disposed on the substrate; and an optical system configured to provide an optical path between an eye of the user and the one or more sensors, and configured to provide the same optical path between the eye of the user and the one or more display devices.

According to an aspect of the present disclosure, a display method is provided, comprising: providing an optical path between an eye of a user and one or more sensors disposed on a substrate of an imaging system coupled to a frame configured to be mounted to a head of the user, and providing the same optical path between the eye of the user and one or more display devices disposed on the substrate.

According to an aspect of the present disclosure, a display system is provided, comprising an imaging system and an optical system. The imaging system is configured to couple to a frame configured to be mounted to a head of a user. The imaging system includes one or more display devices disposed on a substrate, and one or more sensors disposed on the substrate. The optical system is configured to provide an optical path between an eye of the user and the one or more sensors, and configured to provide the same optical path between the eye of the user and the one or more display devices.

According to an aspect of the present disclosure, a head-mounted display system is provided, comprising: a frame configured to be mounted to a head of a user; an imaging system configured to couple to the frame, the imaging system including: one or more display devices disposed on a substrate, and one or more sensors disposed on the substrate; and an optical system configured to guide a part of light emitted by the display devices and configured to guide a part of light detected by the sensors.

BRIEF DESCRIPTION OF THE DRAWINGS

FIGS. 2A and 2B are conceptual diagrams of modification examples of the display apparatus of Example 1.

FIG. 3 is a schematic view of the display apparatus of Example 1, as seen from above.

FIG. 7 is a diagram for illustrating the operation of the display apparatus of Example 3.

FIG. 12A is a schematic cross-sectional view of a theoretical liquid lens taken across line XIIA-XIIA of FIG. 12B. FIG. 12B is a schematic cross-sectional view of the theoretical liquid lens taken across line XIIB-XIIB of FIG. 12A. FIG. 12C is a schematic cross-sectional view of the theoretical liquid lens taken across line XIIC-XIIC of FIG. 12A.

DETAILED DESCRIPTION OF EMBODIMENTS

Figure 1A:
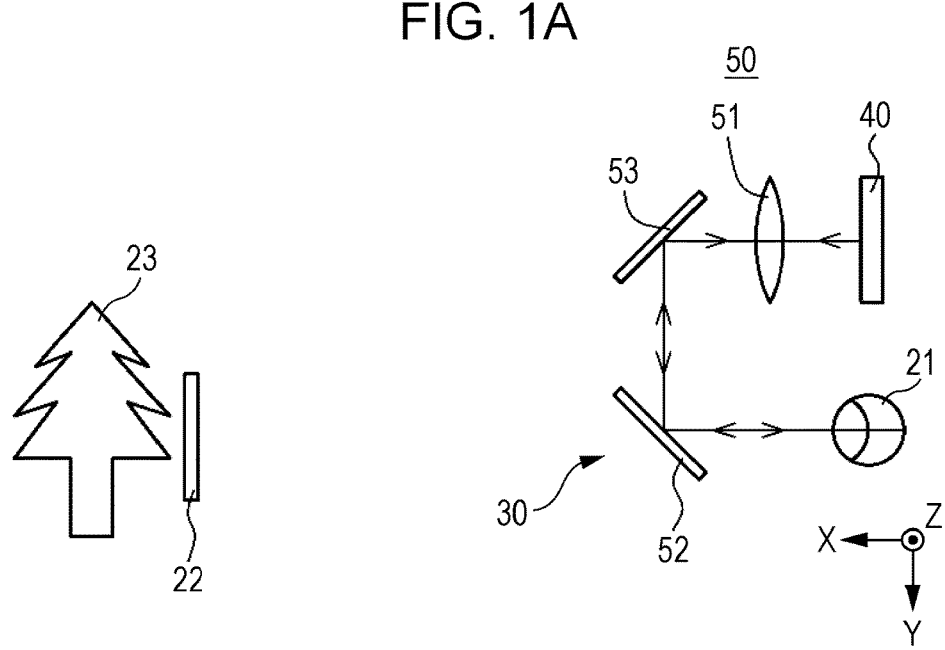
FIG. 1A is a conceptual diagram of a display apparatus of Example 1.

In the head mounted display that is disclosed in the Japanese Unexamined Patent Application, since the distance detecting unit, which detects a distance to an external target object, is configured of a CCD camera, there are problems in that the overall configuration of the head mounted display becomes complicated and it is difficult to miniaturize and lighten the configuration. In addition, the Japanese Unexamined Patent Application does not include a unit for evaluating whether or not an image that is displayed by the display unit (the image forming device) appropriately reaches a user (the observer) of the head mounted display, that is, whether or not the image reaches the observer in a focused state.

Therefore, it is desirable to provide a display apparatus that, despite being of a simple configuration and structure, is capable of easily performing distance measurement to an external target object that the observer observes, and is also capable of easily verifying that an image that is displayed by the image forming device reaches the observer in a focused state.

According to an embodiment of the present disclosure, there is provided a display apparatus that includes a frame to be mounted to a head of an observer; and an image display apparatus that is attached to the frame. The image display apparatus includes an image forming device, and an optical system that guides an image from the image forming device to a pupil of the observer. A distance measuring sensor is provided on an inner portion of an image display unit of the image forming device.

In the display apparatus of the present disclosure, the distance measuring sensor is provided on the inner portion of the image display unit of the image forming device. In other words, the distance measuring sensor is provided integrally with the image forming device. Accordingly, despite using a simple configuration and structure, it is possible to easily perform distance measurement to an external target object that the observer observes, and it is possible to easily verify that an image that is displayed by the image forming device reaches the observer in a focused state. Note that, the effects disclosed in the present specification are merely examples; the disclosure is not limited thereto and may have additional effects.

Hereinafter, description will be given of the present disclosure based on the examples with reference to the drawings. However, the present disclosure is not limited to the examples, and the various numerical values and materials in the examples are merely examples. The description will be given in the following order.
1. Description relating to Display Apparatus and Overall Configuration of Present Disclosure
2. Example 1 (the display apparatus of the present disclosure, the display apparatus of a first embodiment)
3. Example 2 (modification of Example 1, the display apparatus of a second embodiment)
4. Example 3 (another modification of Example 1, the display apparatus of a third embodiment)
5. Example 4 (modification of Example 1 to Example 3)
6. Example 5 (modification of Example 1 to Example 4)
7. Example 6 (modification of Example 1 to Example 5), other configurations Description Relating to Display Apparatus and Overall Configuration of Present Disclosure In the display apparatus of the present disclosure, it is preferable to adopt an embodiment in which the distance measuring sensor is configured to include a plurality of distance measuring elements, and the distance measuring elements are arranged between pixels of the image display unit of the image forming device. The distance measuring elements are formed of light receiving elements, photodiodes, CMOS sensors or CCD sensors with an existing configuration and structure, and a contrast method can be used. Alternatively, it is possible to use a phase difference method. Alternatively, it is possible to adopt a method in which the distance measuring sensor is configured of paired distance measuring elements, and the distance is measured based on deviation of the images that are obtained by the paired distance measuring elements.

In the display apparatus of the present disclosure including the preferable embodiment described above, it is preferable to adopt a configuration in which the optical system includes a lens into which an image from the image forming device is incident, and a semi-transparent mirror (also referred to as a partial reflection mirror, a partial transmittance mirror, a half transmittance mirror or a half mirror) that reflects the image, after the image passes through the lens, and guides the image to the pupil of the observer. In this case, it is preferable to adopt a configuration in which the lens is configured of a liquid lens, and it is preferable to adopt a configuration in which the focal length of the liquid lens is controlled based on the distance that is measured by the distance measuring sensor. The liquid lens and the semi-transparent mirror themselves may be of an existing configuration and structure. A reflector or a second semi-transparent mirror may be arranged between the image forming device and the lens, or between the lens and the semi-transparent mirror, or between both.

In the various preferable configurations of the display apparatus of the present disclosure that are described above, it is possible to adopt an embodiment in which the distance measuring sensor measures a distance from the image forming device, via the lens and the semi-transparent mirror, to a retina of the observer. For convenience, the display apparatus of this embodiment will be referred to as "the display apparatus of the first embodiment". In the display apparatus of the first embodiment, it is preferable to further adopt an embodiment in which a focal length of the lens is controlled based on a distance that is measured by the distance measuring sensor. In other words, by controlling the focal length of the lens, it is possible to cause an image that is displayed by the image forming device to reach the observer in a focused state (e.g., a just focus state). It is preferable to perform the measurement of the distance to the retina of the observer while the image is being displayed on the image forming device. It is possible to adopt existing methods, similar to those described above, for the measurement method of the distance and the control method of the focal length of the lens.

Alternatively, in the various preferable configurations of the display apparatus of the present disclosure that are described above, it is possible to adopt an embodiment in which the distance measuring sensor measures a distance from the image forming device to an external target object that the observer observes. For convenience, the display apparatus of this embodiment will be referred to as "the display apparatus of the second embodiment". In the display apparatus of the second embodiment, it is preferable to further adopt an embodiment in which a focal length of the lens is controlled based on a distance that is measured by the distance measuring sensor. It is preferable to further adopt an embodiment in which information relating to the external target object that the observer observes is displayed on the image forming device. That is, by controlling the focal length of the lens, it is possible to cause the distance to the image (the virtual image) that the observer observes, that is, the image that is displayed by the image forming device to match (or substantially match) that of the external target object that the observer observes. It is preferable that the optical system be further provided with the second semi-transparent mirror between the lens and the semi-transparent mirror. It is preferable to perform the measurement of the distance to the target object while the image is not being displayed on the image forming device. It is possible to adopt existing methods, similar to those described above, for the measurement method of the distance and the control method of the focal length of the lens. It is possible to adopt an existing method for the method of displaying the information relating to the external target object that the observer observes on the image forming device. In regard to the information relating to the external target object, the target object is photographed using the distance measuring sensor (or an imaging device), for example, and the photographed content is analyzed in the display apparatus; thereby, the extraction of various information (for example, description) that is created in advance relating to the target object is performed in the display apparatus and may be displayed on the image forming device. The same also applies to the description hereinafter. Information relating to the external target object may be stored in the display apparatus. For example, the information may be of a format that the display apparatus obtains by accessing a server via the Internet.

Alternatively, in the various preferable configurations of the display apparatus of the present disclosure that are described above, it is possible to adopt an embodiment in which the distance measuring sensor performs detection of a viewpoint of the observer via the lens and the semi-transparent mirror, and obtains a distance from the image forming device to an external target object that the observer observes based on the viewpoint of the observer that is detected. For convenience, the display apparatus of this embodiment will be referred to as "the display apparatus of the third embodiment". In the display apparatus of the third embodiment, it is preferable to further adopt an embodiment in which a focal length of the lens is controlled based on a distance that is measured by the distance measuring sensor. It is preferable to further adopt an embodiment in which information relating to the external target object that the observer observes is displayed on the image forming device. That is, by controlling the focal length of the lens, it is possible to cause the distance to the image (the virtual image) that the observer observes, that is, the image that is displayed by the image forming device to match (or substantially match) that of the external target object that the observer observes. It is preferable that the optical system be further provided with the second semi-transparent mirror between the lens and the semi-transparent mirror. It is preferable that, before performing detection of the viewpoint of the observer, the distance measuring sensor measure the distance from the image forming device, via the lens and the semi-transparent mirror, to the surface of an eyeball of the observer, and subsequently, that the focal length of the lens be controlled based on the distance to the surface of the eyeball that is measured by the distance measuring sensor. Accordingly, it is possible to more accurately perform detection of the viewpoint of the observer. It is preferable to perform the measurement of the distance to the surface of the eyeball of the observer, the detection of the viewpoint of the observer and the measurement of the distance to the target object while the image is not being displayed on the image forming device. It is possible to adopt existing methods, similar to those described above, for the detection method of the viewpoint of the observer, the measurement method of the distance and the control method of the focal length of the lens.

In the various preferable embodiments and configurations of the display apparatus of the present disclosure that are described above, it is preferable to adopt an embodiment in which predetermined information is displayed on the image forming device. In this case, it is preferable that the predetermined information be displayed on a lower portion of the image display unit (an image display region). Examples of the predetermined information include electronic mail; various operational command guides (input interfaces); display of moving images or still images; display of subtitles of movies or the like; display of explanatory sentences or closed captions relating to a video, synchronized with the video; various explanations in relation to the observation target in plays, kabuki, noh, kyogen, opera, musical concerts, ballet, various theatrical performances, amusement parks, art museums, tourist attractions, resorts, tourist guides and the like, explanatory sentences for explaining the content thereof, the state of progress, background information, and the like; display of various explanations, symbols, codes, seals, marks, guidance and the like in relation to driving, operation, maintenance and deconstruction of observation targets such as various devices; display of various explanations, symbols, codes, seals, marks, guidance and the like relating to an observation target such as a person or an object; closed captions; information relating to safety; information relating to meteorology (temperature, humidity and weather forecasts); information relating to health (body temperature, pulse, consumed calories); information relating to time; scheduling; call notifications of social media information, phone calls and the like. In plays, kabuki, noh, kyogen, opera, musical concerts, ballet, various theatrical performances, amusement parks, art museums, tourist attractions, resorts, tourist guides and the like, text relating to the observation target may be displayed at an appropriate timing as an image on the display apparatus. Specifically, for example, an image signal is transmitted to the display apparatus and the image is displayed on the display apparatus by the operation of a worker or under the control of a computer or the like based on a predetermined schedule or time allocation according to the state of progress of a movie, or, the state of progress of a play or the like. When performing the display of various explanations relating to observation targets such as various devices, people or objects, the observation targets such as the various devices, people, objects or the like are photographed using the imaging device, and the photographed content is analyzed in the display apparatus. Therefore, it is possible to perform the display of various explanations that are created in advance relating to observation targets such as various devices, people or objects using the display apparatus. The predetermined information may be stored in the display apparatus. For example, the information may be of a format that the display apparatus obtains by accessing a server via the Internet.

In the various preferable embodiments and configurations of the display apparatus of the present disclosure that are described above, it is preferable to adopt an embodiment in which the image forming device is formed by arranging a plurality of light emitting diodes in a two-dimensional matrix shape. In this case, it is possible to adopt an embodiment in which light shielding members are arranged between the light emitting diodes and the distance measuring elements that configure the distance measuring sensor. A light emitting diode with an existing configuration and structure may be used for the light emitting diode. The light emitting diode has a response time in the nanosecond order, and is a preferable light emitting element since the light emitting diode has an extremely high luminance ($10^5$ cd/cm$^2$ to $10^7$ cd/cm$^2$), it is possible to realize the necessary luminance with an extremely short light emission time. It is possible to easily control the matching and the deviation between the timing of light emission and the timing of the imaging and distance measurement. It is possible to obtain a reduction in crosstalk in which the light emission causes the distance measuring sensor to operate erroneously. The light emitting diode is a preferable light emitting element due to these points. In the light emitting diode, since the element itself can be extremely small, there are merits in that it is possible to miniaturize the image forming device and there is a high degree of freedom in the arrangement of the distance measuring sensor and the imaging devices. As long as the material that configures the light shielding member is a material that can block the light emitted from the light emitting diode, it is possible to use any material. However, the light emitting elements that configure the image forming device are not limited to the light emitting diodes. For example, the light emitting elements may also be configured of organic electro-luminescence elements (organic EL elements), liquid crystal display elements or the like.

When the image forming device displays a color image, one pixel is configured of a red light emitting sub-pixel, a green light emitting sub-pixel and a blue light emitting sub-pixel. The distance measuring elements may be provided adjacent to the pixels, where one distance measuring element corresponds to one pixel, or, adjacent to pixels, where one distance measuring element corresponds to a plurality of pixels. In some cases, imaging devices may be provided on an inner portion of the image display unit of the image forming device. The imaging devices may be provided adjacent to the pixels, where one imaging device corresponds to one pixel, or, adjacent to pixels, where one imaging device corresponds to a plurality of pixels. When the pixels are used as a reference, one distance measuring element and one imaging device may be provided for one pixel, or, one distance measuring element may be provided in relation to one of a plurality of pixels, and one imaging device may be provided in relation to each of the remaining pixels.

By providing the imaging devices, it becomes possible to specify the target object by imaging the external target object that the observer observes. As a result, it is possible to display the information relating to the external target object that the observer observes on the image forming device.

It is preferable that the light reception wavelength of the distance measuring elements that are provided adjacent to the pixels be different from the light emission wavelength of the adjacent pixels. Specifically, it is preferable that the light reception wavelength of the distance measuring elements that are provided adjacent to the pixels be different from the light emission wavelength of the adjacent sub-pixels, from the perspective of reducing optical crosstalk. The color filters may be arranged on the distance measuring elements in order to achieve this. Specifically, a distance measuring element that receives green or blue light may be provided adjacent to the red light emitting sub-pixel, a distance measuring element that receives red or blue light may be provided adjacent to the green light emitting sub-pixel, and a distance measuring element that receives red or green light may be provided adjacent to the blue light emitting sub-pixel.

The distance measuring sensor is provided on the inner portion of the image display unit of the image forming device. Specifically, for example, the distance measuring elements (and further, imaging devices, as necessary) may be formed on a semiconductor substrate. Alternatively, on-chip distance measuring elements (and further, on-chip imaging devices, as necessary) may be arranged on a substrate. The light emitting elements may be provided on the semiconductor substrate or above the semiconductor substrate. More specifically, the light emitting elements may be attached to a wiring that is provided on the semiconductor substrate or the substrate, and the light emitting elements may be formed on an interlayer insulation layer formed on the semiconductor substrate. The display apparatus may be provided with one image display apparatus (a monocular display apparatus), or may be provided with two image display apparatuses (a binocular display apparatus).

As long as the frame has a configuration and structure in which the frame can be mounted on the head of the observer and the image display apparatus can be attached thereto, any format may be adopted. For example, it is possible to adopt a configuration in which the frame is formed of a front portion, which is arranged on the front of the observer, and side portions, which extend from both ends of the front portion. Examples of the number of pixels of the image forming device include 320×240, 432×240, 640×480, 1024×768 and 1920×1080.

Example 1

Figure 1B:
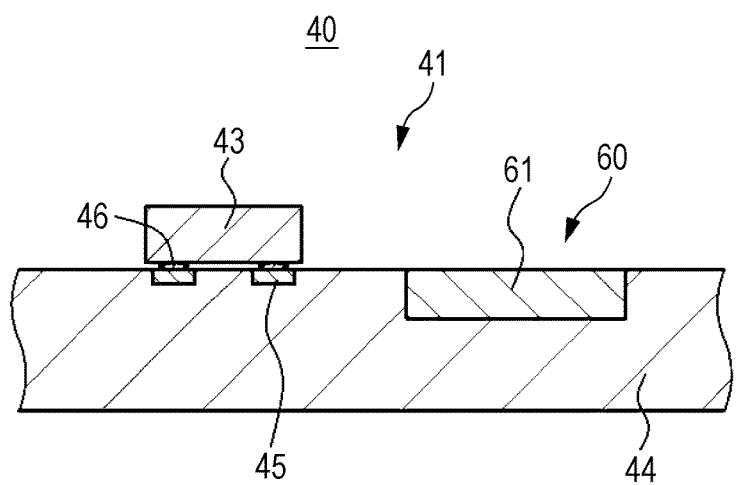
FIG. 1B is a schematic partial cross-sectional view of an image display unit of an image forming device that configures the display apparatus of Example 1.
Figure 4:
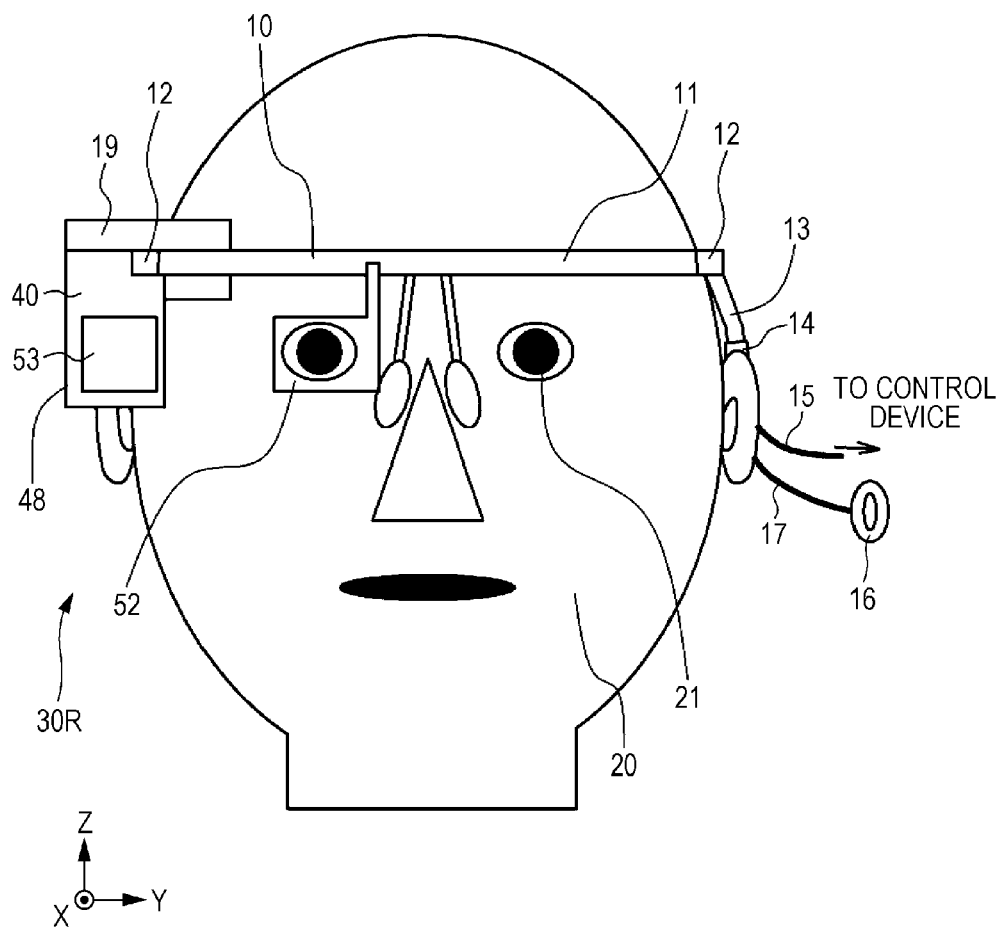
FIG. 4 is a schematic view of the display apparatus of Example 1, as seen from the front.
Figure 5A:
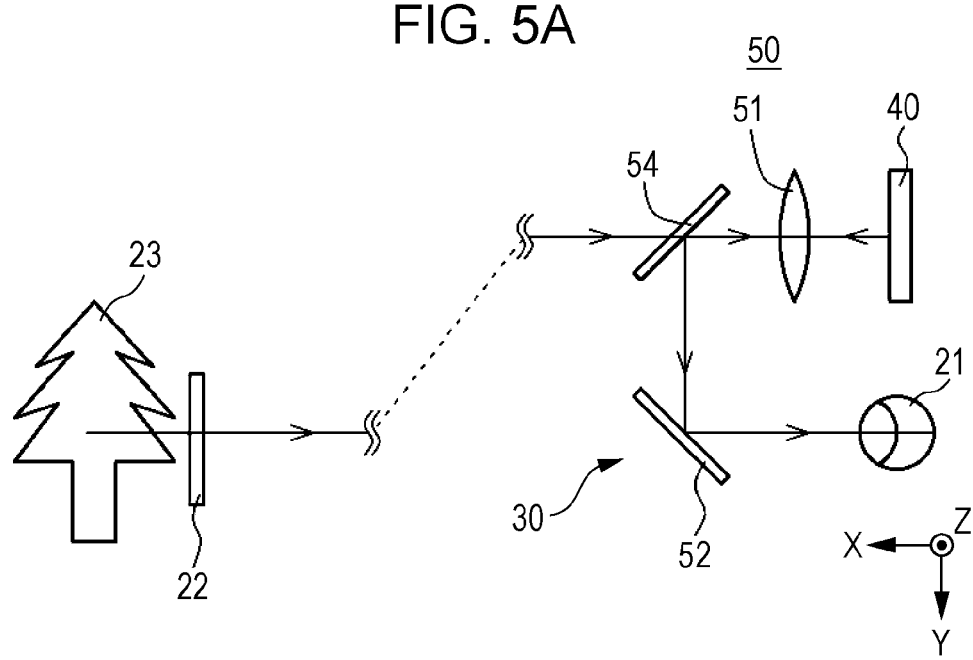
FIGS. 5A and 5B are conceptual diagrams of display apparatuses of Example 2 and Example 3, respectively.
Figure 5B:
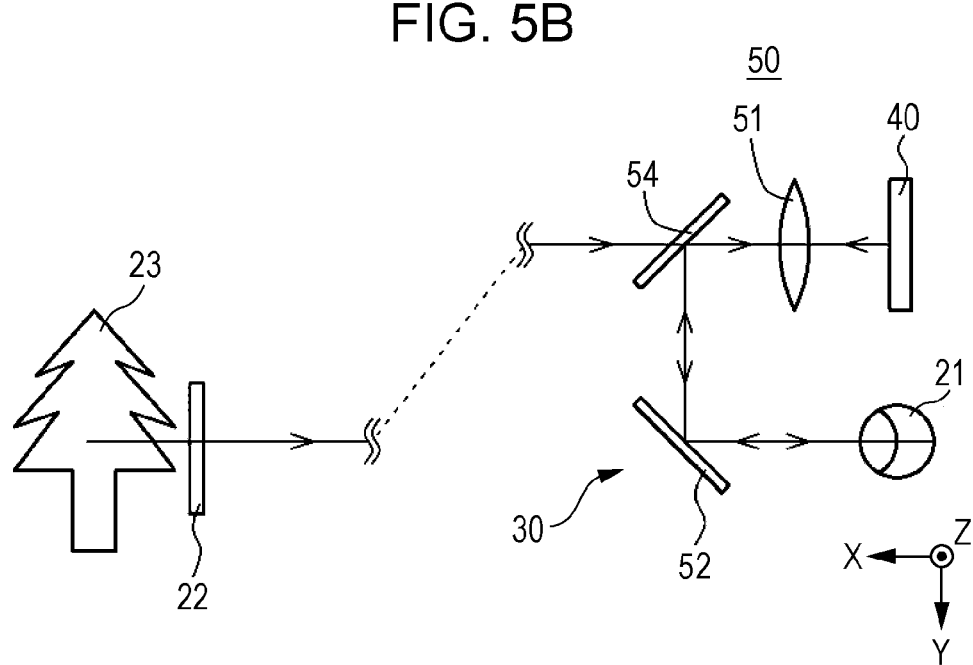

Example 1 relates to the display apparatus of the present disclosure; more specifically, to the display apparatus of the first embodiment. A conceptual diagram of the display apparatus of Example 1 is shown in FIG. 1A, a schematic partial cross-sectional view of the image display unit of the image forming device that configures the display apparatus of Example 1 is shown in FIG. 1B, a schematic view of the display apparatus of Example 1, as seen from above, is shown in FIG. 3, and a schematic view of the display apparatus of Example 1, as seen from the front, is shown in FIG. 4. Schematic views for illustrating arrangement states of the pixels and the distance measuring elements in a portion of the image display unit of the image forming device are shown in FIGS. 8A to 9B. Note that, in FIG. 1A or the later-described FIGS. 5A and 5B, the image forming device and the optical system are shown as viewed from above the observer. For convenience, an axial line that corresponds to the optical axis of a right-side pupil of the observer is set to an X axis, and an axial line that connects the right-side pupil with a left-side pupil of the observer and goes from the right-side pupil to the left-side pupil is set to a Y axis.

A display apparatus of Example 1 includes a frame 10 to be mounted to a head of an observer 20; and an image display apparatus 30 that is attached to the frame 10. The image display apparatus 30 includes an image forming device 40, and an optical system 50 that guides an image from the image forming device 40 to a pupil of the observer. Note that, in the display apparatus shown in the drawings, a binocular display apparatus that is provided with a right-eye image display apparatus 30R and a left-eye image display apparatus 30L is adopted; however, a monocular display apparatus that is provided with one of the right-eye image display apparatus and the left-eye image display apparatus may also be adopted. Note that, in FIG. 4, in order to simplify the drawing, only the right-eye image display apparatus 30R is shown, and the left-eye image display apparatus 30L is omitted from the drawing.

The image forming device 40 is formed by arranging a plurality of light emitting elements, which have an existing configuration and structure, more specifically, light emitting diodes 43 in a two-dimensional matrix shape. A distance measuring sensor 60 is provided on the inner portion of an image display unit 41 of the image forming device 40. Specifically, the distance measuring sensor 60 is configured to include a plurality of distance measuring elements 61, and the distance measuring elements 61 are arranged between pixels 42 of the image display unit 41 of the image forming device 40. Here, since the image forming device 40 displays a color image, one of the pixels 42 is configured of a red light emitting sub-pixel 42R that is configured of a light emitting diode that emits red light, a green light emitting sub-pixel 42G that is configured of a light emitting diode that emits green light and a blue light emitting sub-pixel 42B that is configured of a light emitting diode that emits blue light.

More specifically, as shown in FIG. 1B, the distance measuring elements 61 are formed of photodiodes, which are formed on a silicon semiconductor substrate 44 using an existing method and are of an existing configuration and structure. The on-chip light emitting diodes 43 are attached to a wiring 45 that is formed on the silicon semiconductor substrate 44, for example, via a solder bump 46. Note that the method of attachment is not limited thereto.

Figure 8A:
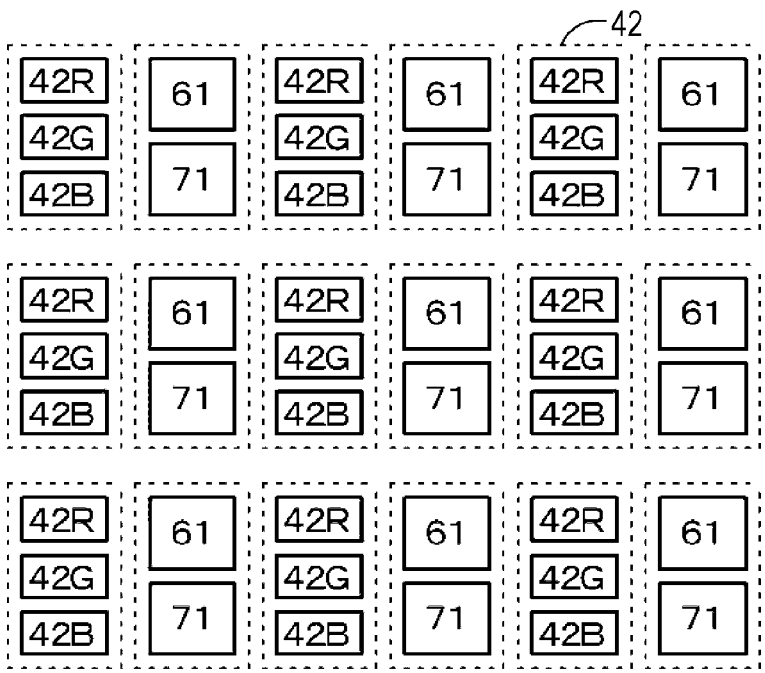
FIGS. 8A and 8B are schematic views for illustrating arrangement examples of pixels and distance measuring elements in a portion of the image display unit of the image forming device that configures the display apparatus of Example 1.
Figure 8B:
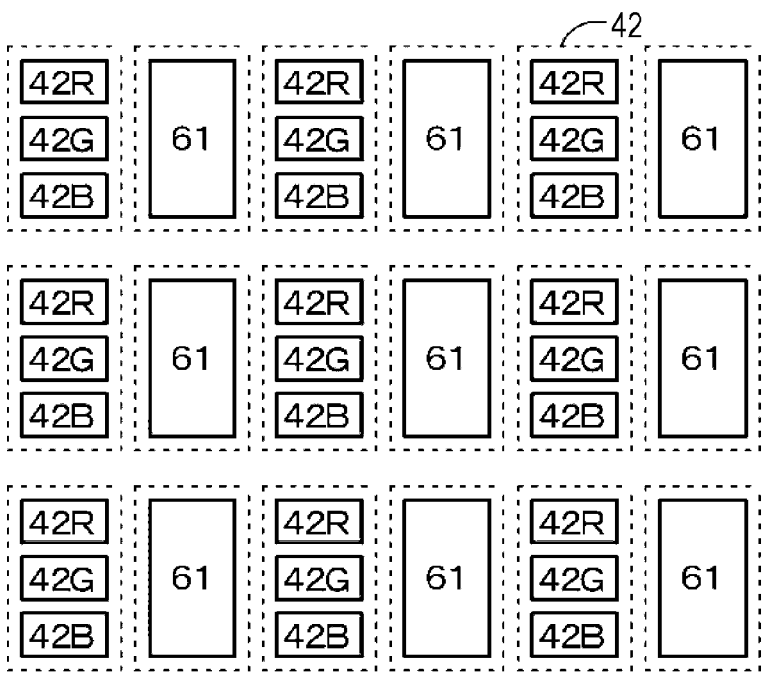
Figure 9A:
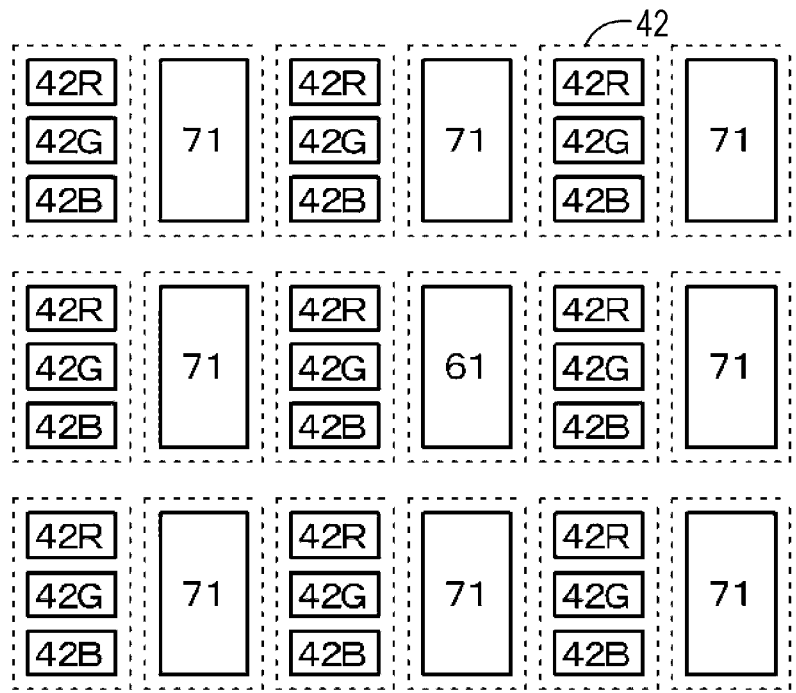
FIGS. 9A and 9B are schematic views for illustrating arrangement examples of pixels and distance measuring elements in a portion of the image display unit of the image forming device that configures the display apparatus of Example 1.
Figure 9B:
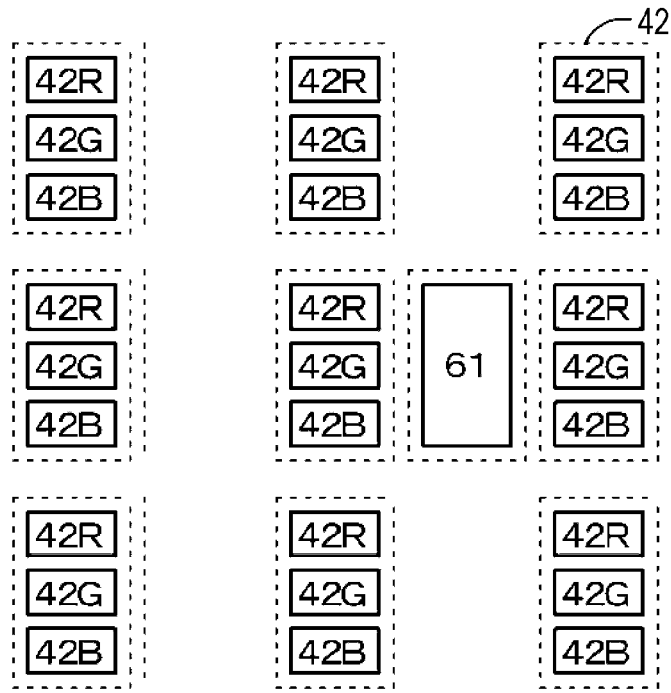

As shown in FIGS. 8A and 8B, the distance measuring elements 61 are provided adjacent to the pixels 42, where one of the distance measuring elements 61 corresponds to one of the pixels 42. Alternatively, as shown in FIGS. 9A and 9B, the distance measuring elements 61 are provided adjacent to the pixels 42, where one of the distance measuring elements 61 corresponds to a plurality of the pixels 42. Note that, in the examples shown in FIGS. 8A and 9A, imaging devices 71 are provided on the inner portion of the image display unit of the image forming device 40. In the example shown in FIG. 8A, one of the imaging devices 71 is provided in relation to one of the pixels 42. In the example shown in FIG. 9A, the imaging devices 71 are not provided for a portion of the pixels 42. In other words, in the example shown in FIG. 8A, one of the distance measuring elements 61 and one of the imaging devices 71 are provided for one of the pixels 42. In the example shown in FIG. 8B, one of the distance measuring elements 61 is provided for one of the pixels 42; however, the imaging devices 71 are not provided. Furthermore, in the example shown in FIG. 9A, one of the distance measuring elements 61 is provided in relation to one of a plurality of the pixels 42, and one of the imaging devices 71 is provided in relation to each of the remaining pixels 42. In the example shown in FIG. 9B, one of the distance measuring elements 61 is provided in relation to one of a plurality of the pixels 42, and the distance measuring elements 61 and the imaging devices 71 are not provided in relation to the remaining pixels 42. The imaging devices 71 that have an existing configuration and structure are formed on the silicon semiconductor substrate 44 based on an existing method, in the same manner as the distance measuring elements 61. Note that, the on-chip imaging devices may be attached to a wiring that is formed on the silicon semiconductor substrate 44 via solder bumps, for example.

In the display apparatus of Example 1, the optical system 50 includes a lens 51 into which an image from the image forming device 40 is incident, and a semi-transparent mirror 52 that reflects the image, after the image passes through the lens 51, and guides the image to a pupil 21 of the observer 20. The lens 51 is formed of a liquid lens that has an existing configuration and structure. Note that, a reflector 53 for changing the optical path is arranged between the lens 51 and the semi-transparent mirror 52.

In Example 1, the distance measuring sensor 60 measures a distance from the image forming device 40, via the lens 51, the reflector 53 and the semi-transparent mirror 52, to a retina of the pupil 21 of the observer 20. A focal length of the lens 51 is controlled based on a distance that is measured by the distance measuring sensor 60. For the measurement method of the distance, an existing contrast method may be adopted, a phase difference method may be adopted, and, a method in which the distance is measured based on deviation of the images that are obtained by the paired distance measuring elements 61 may be adopted. Specifically, the image from the image forming device 40, via the lens 51, the reflector 53 and the semi-transparent mirror 52, reaches the retina of the pupil 21 of the observer 20. Conversely, however, the image of the retina of the pupil 21 of the observer 20 is obtained in the distance measuring sensor 60 that is provided on the inner portion of the image display unit 41 of the image forming device 40 via the semi-transparent mirror 52, the reflector 53 and the lens 51. In other words, by investigating whether or not the obtained image of the retina of the pupil 21 of the observer 20 is in a focused state using the distance measuring sensor 60, it is possible to easily verify whether or not an image that is displayed by the image forming device 40 reaches the observer 20 in a focused state. Control of the focal length of the lens 51 is performed such that the obtained image of the retina is in a focused state. In this manner, it is possible to guarantee that the image that is displayed by the image forming device 40 reaches the user (the observer 20) of the display apparatus in a focused state. Note that reference numeral 22 represents a virtual projection screen. The image that is displayed by the image forming device and is the image (the virtual image) that the observer observes is observed by the observer on a virtual projection screen 22.

Figure 6A:
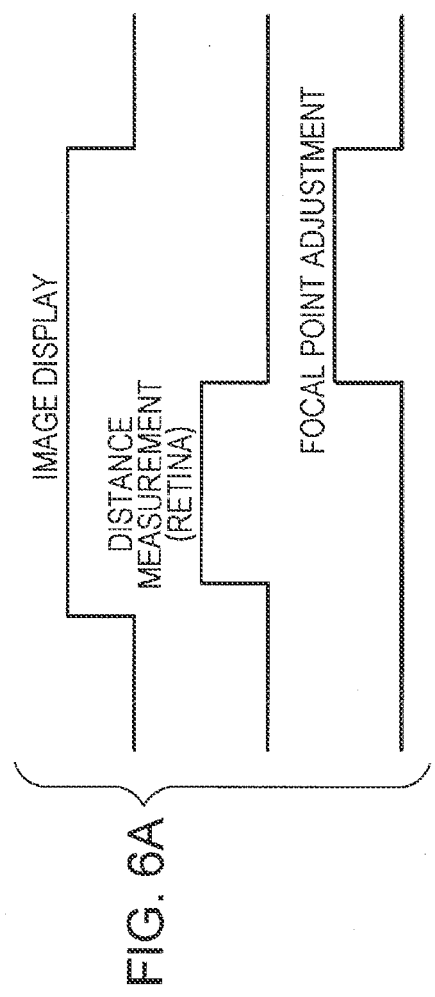
FIGS. 6A and 6B are diagrams for illustrating the operation of the display apparatuses of Example 1 and Example 2, respectively.

In Example 1, the measurement of the distance from the image forming device 40 to the retina of the pupil 21 of the observer 20 is performed, for example, once for every 60 image display frames (that is, once every ¹⁄₆₀ of a second). However, the present disclosure is not limited to this number, and can also be set to, for example, once for every 120 image display frames or once for every 240 image display frames. In FIG. 6A, a diagram for illustrating the operation of the display apparatus of Example 1 is shown. The measurement of the distance to the retina of the observer 20 and the control of the focal length of the lens 51 are performed while the image is being displayed on the image forming device 40.

FIGS. 2A and 2B show conceptual diagrams of modification examples of the display apparatus of Example 1. In the example shown in FIG. 2A, the reflector 53 is omitted and the image that is emitted from the lens 51 directly strikes the semi-transparent mirror 52. Note that, in FIG. 2A, the image forming device 40 and the optical system 50 are shown as viewed from above the observer, and the image forming device 40 is arranged on the right-side of the head of the observer. In the example shown in FIG. 2B, the reflector 53 is omitted and the image that is emitted from the lens 51 directly strikes the semi-transparent mirror 52. Note that, in FIG. 2B, the image forming device 40 and the optical system 50 are shown as viewed from the side of the observer, and the image forming device 40 and the lens 51 are arranged above the semi-transparent mirror 52.

The frame 10 is formed of a front portion 11, which is arranged on the front of the observer 20, two temple portions 13, which are attached to both ends of the front portion 11 via hinges 12 in a free-rotating manner, and temple tips (also referred to as earpieces) 14, which are attached to the tip portions of each of the temple portions 13. Nosepads (not shown) are also attached. In other words, the assembled body of the frame 10 and the nose pad essentially has substantially the same structure as normal eyeglasses. Furthermore, a housing 48, which stores the image forming device 40 and the lens 51 and to which the reflector 53 is attached, is attached to the temple portions 13 in a freely removable manner using attachment members 19. The semi-transparent mirror 52 is attached to the front portion 11. The frame 10 is manufactured to be formed of metal or plastic. Note that, the housing 48 may be attached to the temple portion 13 using the attachment members 19 in a non-removable manner. In relation to an observer that owns and wears eyeglasses, the housing 48 may be attached to the temple portions of the frame of the eyeglasses, which are owned by the observer, in a freely removable manner using the attachment members 19. The housing 48 may be attached to the outside of the temple portions 13 and may also be attached to the inside of the temple portions 13.

A wiring (a signal line, a power supply line or the like) 15 that extends from one of the image forming devices 40 extends from the tip portion of the temple tip 14 to the outside via the temple portion 13 and the inner portion of the temple tip 14 is connected to a control device (a control circuit or a control unit) 18. Furthermore, the image forming device 40 is provided with a headphone portion 16. A headphone portion wiring 17, which extends from the image forming device 40, extends from the tip portion of the temple tip 14 to the headphone portion 16 via the temple portion 13 and the inner portion of the temple tip 14. More specifically, the headphone portion wiring 17 extends from the tip portion of the temple tip 14 to the headphone portion 16 so as to wrap around the rear-side of an auricle (a pinna). By adopting such a configuration, it is possible to realize a streamlined display apparatus that does not give the impression that the headphone portion 16 and the headphone portion wiring 17 are arranged in a disorderly manner.

The lens 51 is configured of an existing liquid lens 100, which uses the electrowetting phenomenon.

The principles of the liquid lens will be described with reference to the principle diagrams of FIGS. 12A to 13C. FIG. 12A is a schematic cross-sectional view taken across line XIIA-XIIA of FIG. 12B. FIG. 12B is a schematic cross-sectional view (where a first liquid is not depicted) taken across line XIIB-XIIB of FIG. 12A. FIGS. 12C to 13C are schematic cross-sectional views taken across line XIIC-XIIC, XIII-XIII of FIG. 12A. Note that, the shape of the liquid lens when cut across the x-y plane is the schematic shape and differs from the actual shape.

The liquid lens (referred to as "the theoretical liquid lens" for convenience) for which the principle diagrams are shown in FIGS. 12A to 13C is provided with a housing. The housing is formed of a first side member 101, a second side member 102 that opposes the first side member 101, a third side member 103 that joins one end portion of the first side member 101 to one end portion of the second side member 102, a fourth side member 104 that joins the other end portion of the first side member 101 to the other end portion of the second side member 102, a top plate 105 that is attached to the top surfaces of the first side member 101, the second side member 102, the third side member 103 and the fourth side member 104, and a base plate 106 that is attached to the base surfaces of the first side member 101, the second side member 102, the third side member 103 and the fourth side member 104. A single lens chamber is configured of this housing. The lens chamber is filled with a first liquid 115 and a second liquid 116 that configure the liquid lens as a cylindrical lens, the axial line of which extends in a direction (a z direction) in which the first side member 101 and the second side member 102 extend.

A first electrode (hereinafter referred to simply as a "first electrode 111") that configures the liquid lens is provided on an inner surface of a portion of the top plate 105, a second electrode (hereinafter referred to simply as a "second electrode 112") that configures the liquid lens is provided on an inner surface of the first side member 101, and a third electrode (hereinafter referred to simply as a "third electrode 113") that configures the liquid lens is provided on an inner surface of the second side member 102. Here, in the states shown in FIGS. 12A to 12C, no voltage is being applied to the first electrode 111, the second electrode 112 or the third electrode 113.

Figure 13A:
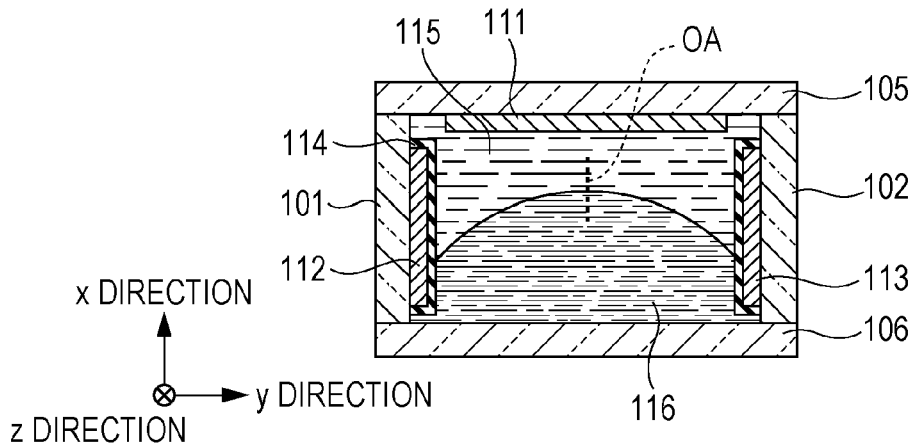
FIGS. 13A, 13B, and 13C are schematic cross-sectional views of the theoretical liquid lens taken across line XIII-XIII of FIG. 12A, and are views for schematically illustrating the operation of the liquid lens.
Figure 13B:
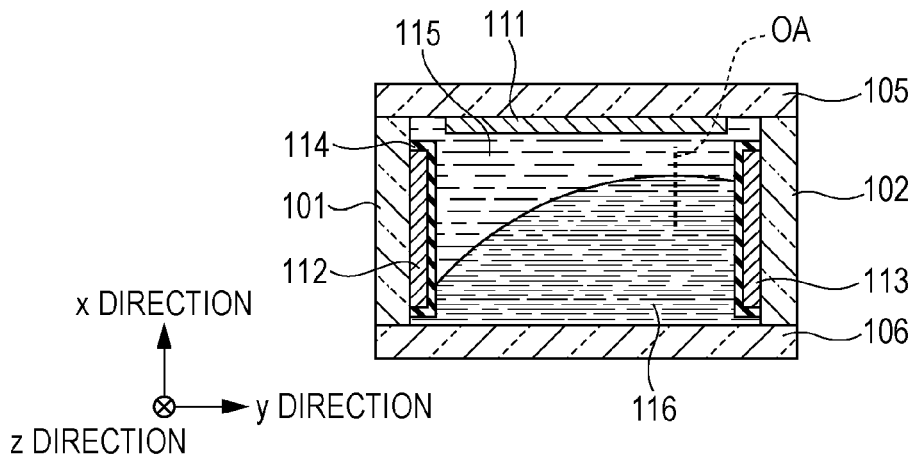
Figure 13C:
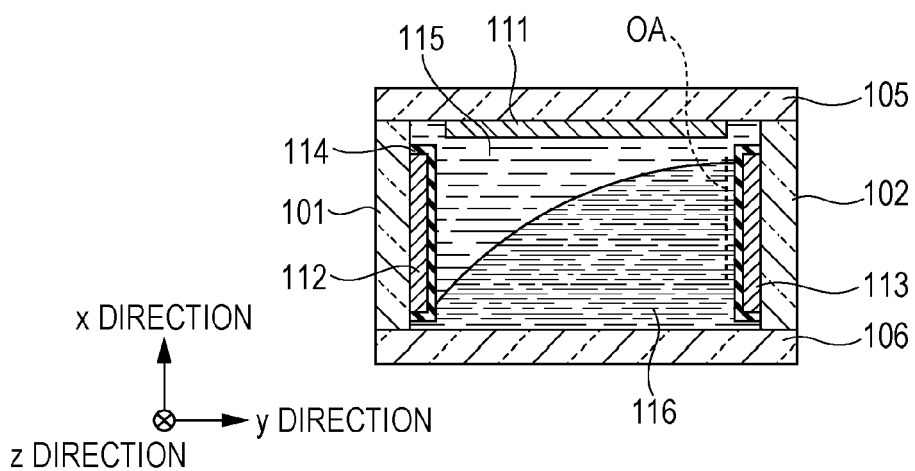

From this state, when an appropriate voltage is applied to the first electrode 111, the second electrode 112 and the third electrode 113, the state of the interface between the first liquid 115 and the second liquid 116 changes to a state shown in FIG. 13A, 13B or 13C. Here, the state shown in FIG. 13A shows a state in which the same voltage is applied to the second electrode 112 and the third electrode 113, and the shape of the liquid lens that is formed within the lens chamber when cut across the x-y plane is symmetrical in relation to an optical axis OA. The states shown in FIGS. 13B and 13C show states in which different voltages are applied to the second electrode 112 and the third electrode 113, and the shape of the liquid lens that is formed within the lens chamber when cut across the x-y plane is asymmetrical in relation to the optical axis OA. Note that, the potential difference between the second electrode 112 and the third electrode 113 is greater in the state shown in FIG. 13C than that in the state shown in FIG. 13B. As shown in FIGS. 13B and 13C, it is possible to change the optical power of the liquid lens corresponding to the potential difference between the second electrode 112 and the third electrode 113, and it is possible to cause the optical axis OA (shown by the dotted line) of the liquid lens to move in a y direction that is perpendicular to the z direction. Alternatively, by arranging a plurality of the liquid lenses shown in the principle diagrams in a row and appropriately controlling the voltages applied to the second electrode 112 and the third electrode 113 of each of the liquid lenses, it is possible to cause the optical axis of the overall liquid lens to move, to cause the incline of the optical axis of the overall liquid lens to change, and to configure a Fresnel lens using the overall liquid lens.

Figure 14:
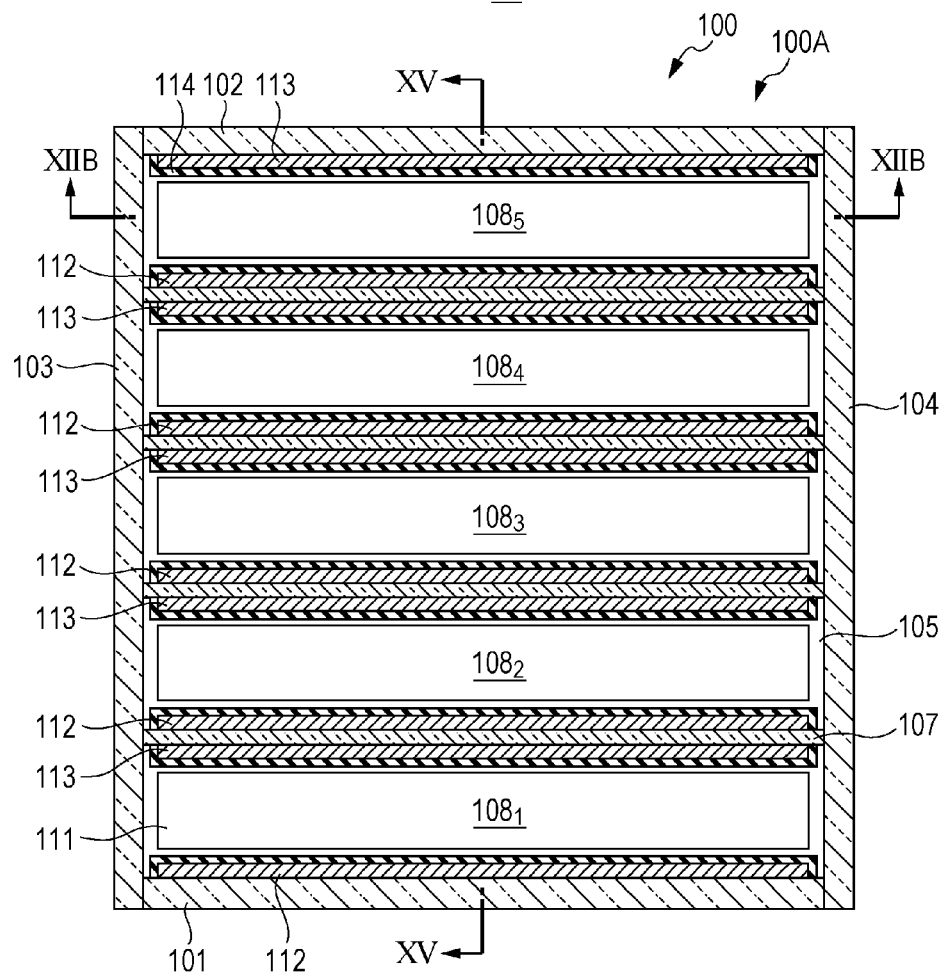
FIG. 14 is a schematic cross-sectional view, similar to the cross-sectional view of the liquid lens taken across line XIV-XIV of FIG. 12B.
Figure 15A:
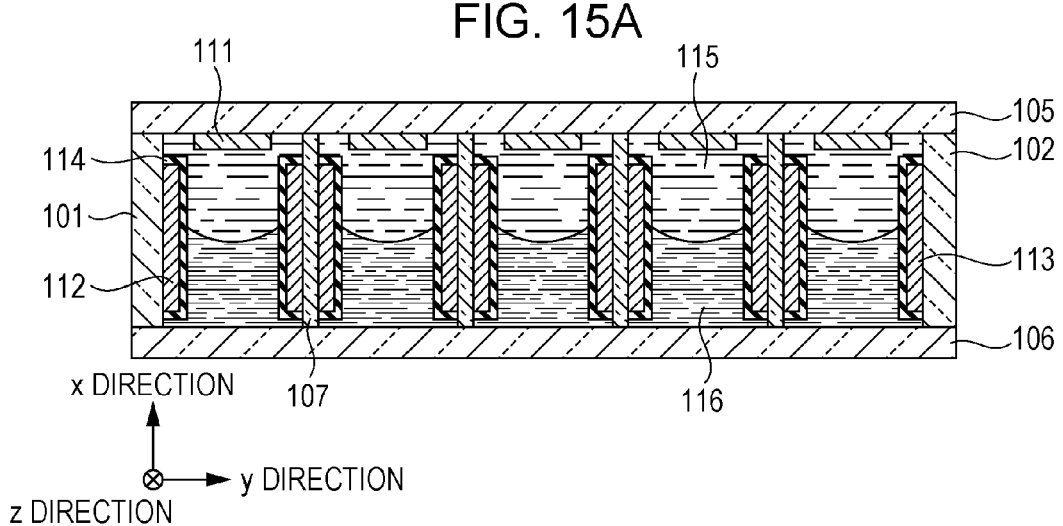
FIGS. 15A, 15B, and 15C are schematic cross-sectional views of the liquid lens taken across line XV-XV of FIG. 14, and are views for schematically illustrating the operation of the liquid lens.
Figure 15B:
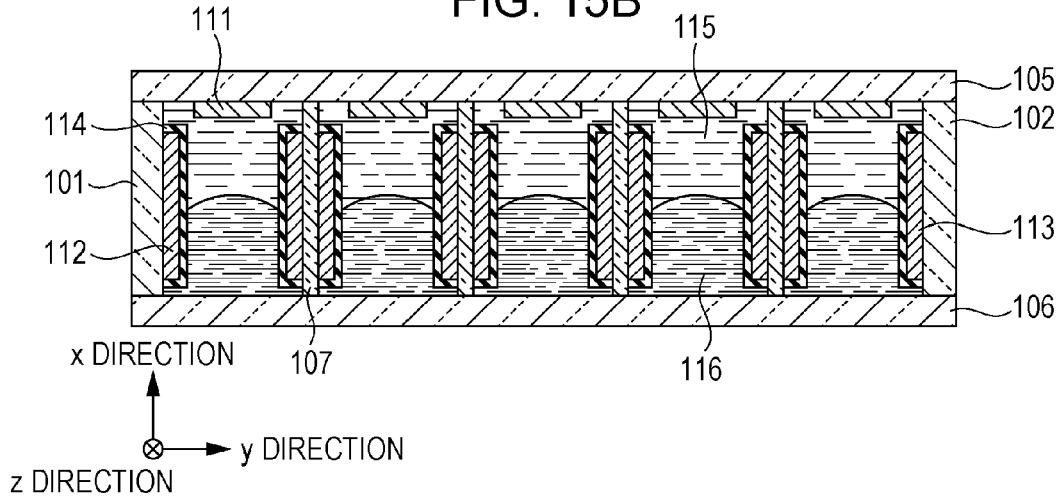
Figure 15C:
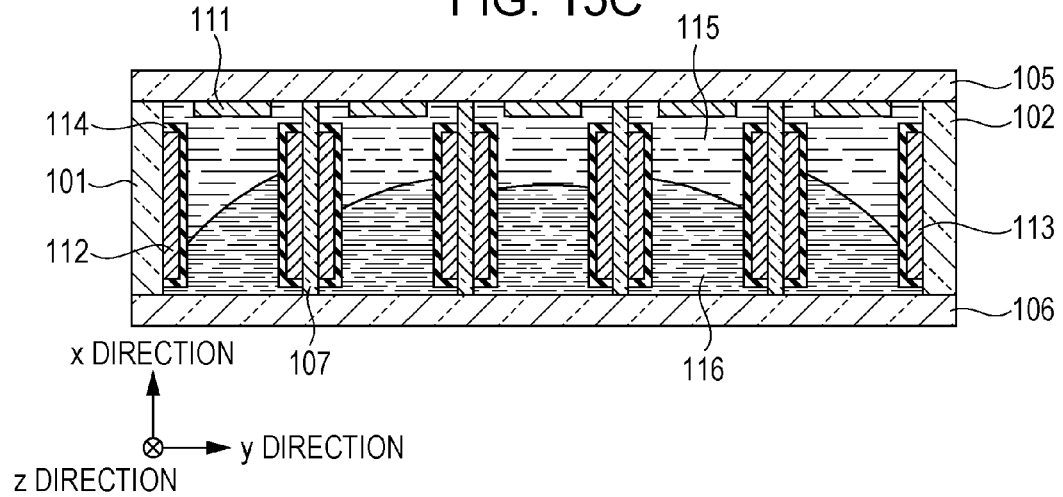

The schematic cross-sectional views of the practical liquid lens 100 in Example 1 are shown in FIGS. 14 to 15C. FIG. 14 is a schematic cross-sectional view, similar to the cross-sectional view taken across line XIIA-XIIA of FIG. 12B. FIGS. 15A to 15C are schematic cross-sectional views taken across line XV-XV of FIG. 14. The schematic cross-sectional view taken across line XIIB-XIIB of FIG. 14 is similar to that shown in FIG. 12B.

The liquid lens 100 is provided with a housing 100A that is provided with the first side member 101, the second side member 102 that opposes the first side member 101, the third side member 103 that joins one end portion of the first side member 101 to one end portion of the second side member 102, the fourth side member 104 that joins the other end portion of the first side member 101 to the other end portion of the second side member 102, the top plate 105 that is attached to the top surfaces of the first side member 101, the second side member 102, the third side member 103 and the fourth side member 104, and the base plate 106 that is attached to the base surfaces of the first side member 101, the second side member 102, the third side member 103 and the fourth side member 104, and (M−1) partition wall members 107 that are arranged parallel to one another between the first side member 101 and the second side member 102.

In the liquid lens 100 in Example 1, M (=5) lens chambers 108 ($108_1$, $108_2$, $108_3$, $108_4$ and $108_5$) are arranged in a row. Here, each of the lens chambers 108 ($108_1$, $108_2$, $108_3$, $108_4$ and $108_5$) is filled with the first liquid 115 and the second liquid 116 that configure the liquid lens as a cylindrical lens, the axial line of which extends in a direction (the z direction) parallel to the direction in which the partition wall members 107 extend.

The first lens chamber $108_1$ is configured of the first side member 101, the third side member 103, the first partition wall member 107, the fourth side member 104, the top plate 105 and the base plate 106. The first electrode 111 is provided on the inner surface of a portion of the top plate 105 that configures the first lens chamber $108_1$, the second electrode 112 is provided on the inner surface of a portion of the first side member 101 that configures the first lens chamber $108_1$, and the third electrode 113 is provided on the inner surface of a portion of the first partition wall member 107 that configures the first lens chamber $108_1$.

The (m+1)th lens chamber $108_{(m+1)}$ is configured of the m-th (where m=1, 2 . . . M−2) partition wall member 107, the third side member 103, the (m+1)th partition wall member 107, the fourth side member 104, the top plate 105 and the base plate 106. The first electrode 111 is provided on the inner surface of a portion of the top plate 105 that configures the (m+1)th lens chamber $108_{(m+1)}$, the second electrode 112 is provided on the inner surface of a portion of the m-th partition wall member 107 that configures the (m+1)th lens chamber $108_{(m+1)}$, and the third electrode 113 is provided on the inner surface of a portion of the (m+1)th partition wall member 107 that configures the (m+1)th lens chamber $108_{(m+1)}$.

Furthermore, the M-th lens chamber $108_M$ (=$108_5$) is configured of the (M−1)th partition wall member 107, the third side member 103, the second side member 102, the fourth side member 104, the top plate 105 and the base plate 106. The first electrode 111 is provided on the inner surface of a portion of the top plate 105 that configures the M-th lens chamber $108_M$ (=$108_5$), the second electrode 112 is provided on the inner surface of a portion of the (M−1)th partition wall member 107 that configures the M-th lens chamber $108_M$ (=$108_5$), and the third electrode 113 is provided on the inner surface of a portion of the second side member 102 that configures the M-th lens chamber $108_M$ (=$108_5$).

Note that, in the depicted examples, the first electrodes 111 are provided for each of the lens chambers; however, one of the first electrodes 111 may be provided on the inner surface of the top plate 105.

In the liquid lens 100 in Example 1, the surfaces of each of the first side member 101, the second side member 102 and the partition wall member 107, at which at least the interface between the first liquid 115 and the second liquid 116 is positioned, are subjected to hydrophobic treatment. The base surface of the partition wall member 107 extends to the base plate 106, and the top surface of the partition wall member 107 extends to the top plate 105. The external shape of the housing 100A is a rectangle shape that has a long side in the z direction and a short side in the y direction. Light enters from the base plate 106 and light is emitted from the top plate 105.

The first liquid 115 and the second liquid 116 are insoluble and do not mix together, and the interface between the first liquid 115 and the second liquid 116 configures a lens surface. Here, the first liquid 115 is conductive, the second liquid 116 is insulative, the first electrode 111 is in contact with the first liquid 115, the second electrode 112 is in contact with the first liquid 115 and the second liquid 116 via an insulating film 114, and the third electrode 113 is in contact with the first liquid 115 and the second liquid 116 via the insulating film 114. The top plate 105, the base plate 106 and the first electrode 111 are configured of materials that are transparent in relation to the light that is incident to the liquid lens 100.

More specifically, the top plate 105, the base plate 106, the first side member 101, the second side member 102, the third side member 103, the fourth side member 104 and the partition wall members 107 are manufactured to be formed of glass or a resin such as an acrylic resin. The first liquid 115, which is conductive, is formed of a lithium chloride aqueous solution, has a density of 1.06 grams/cm$^3$ and a refractive index of 1.34. On the other hand, the second liquid 116, which is insulative, is formed of silicone oil (TSF437, manufactured by Momentive Performance Materials Japan Inc.), has a density of 1.02 grams/cm$^3$ and a refractive index of 1.49. The first electrode 111 is formed of ITO, and the second electrode 112 and the third electrode 113 are formed of metallic electrodes such as gold, aluminum, copper and silver, for example. Furthermore, the insulating film 114 is formed of a metallic oxide such as poly-para-xylene, tantalum oxide, titanium oxide or the like. Note that a hydrophobic treatment layer (not shown) is provided on the insulating film 114. The hydrophobic layer is formed of poly-para-xylene or a fluorine-based polymer. It is preferable that the surface of the first electrode 111 be subjected to hydrophilic treatment, and that the inner surfaces of the third side member 103 and the fourth side member 104 be subjected to hydrophobic treatment.

In Example 1, in order to configure the lens 51, two of the liquid lens 100 shown in FIG. 14 are overlapped. Specifically, the liquid lenses 100 are overlapped such that the y direction of the liquid lens 100 of the lower side and the y direction of the liquid lens 100 of the upper side are perpendicular, and also that the z direction of the liquid lens 100 of the lower side and the z direction of the liquid lens 100 of the upper side are perpendicular.

The first electrode 111, the second electrode 112 and the third electrode 113 are connected to the control apparatus (the control circuit) 18 via a connecting portion (not shown), and have a configuration and structure in which predetermined voltages are applied thereto. When a voltage is applied to the first electrode 111, the second electrode 112 and the third electrode 113, the lens surface that is configured of the interface between the first liquid 115 and the second liquid 116 changes from a state of being downwardly convex as shown in FIG. 15A to a state of being upwardly convex as shown in FIG. 15B. The state of the change of the lens surface changes according to the voltages applied to the electrodes 111, 112 and 113 based on the Lippman-Young equation. In the example shown in FIG. 15B, the same voltage is applied to the second electrode 112 and the third electrode 113. Therefore, the shape of the liquid lens that is formed within the lens chamber when cut across the x-y plane is symmetrical in relation to the optical axis of the liquid lens. Of the two overlapped liquid lenses 100, control may be performed in relation to the liquid lens 100 of the upper side in this manner.

The state shown in FIG. 15C shows a state in which different voltages are applied to the second electrode 112 and the third electrode 113, and the shape of the liquid lens that is formed within the lens chamber when cut across the x-y plane is asymmetrical in relation to the optical axis of the liquid lens. Here, in the state shown in FIG. 15C, a Fresnel lens is configured using the liquid lenses 100. Of the two overlapped liquid lenses 100, control may be performed in relation to the liquid lens 100 of the upper side in this manner.

A configuration may be adopted in which the second electrodes 112 are connected to a common wiring, the third electrodes 113 are connected to a common wiring, the same voltage is applied to each of the second electrodes 112, and the same voltage is applied to each of the third electrodes 113. Alternatively, a configuration may be adopted in which the second electrodes 112 are connected to a common wiring, the third electrodes 113 are connected to individual wirings and different voltages are applied to individual third electrodes 113. A configuration may be adopted in which the third electrodes 113 are connected to a common wiring, the second electrodes 112 are connected to individual wirings and different voltages are applied to individual second electrodes 112. Furthermore, a configuration may be adopted in which both the second electrodes 112 and the third electrodes 113 are connected to individual wirings and different voltages are applied to individual electrodes 112 and 113.

Figure 16:
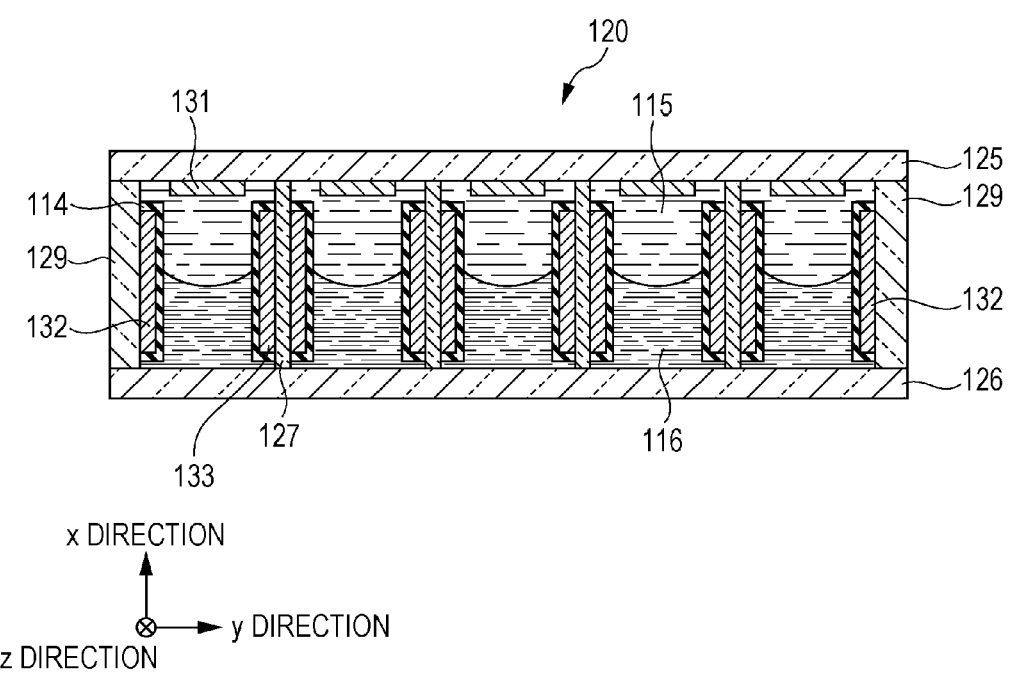
FIG. 16 is a schematic cross-sectional view of a liquid lens of a different configuration.
Figure 17:
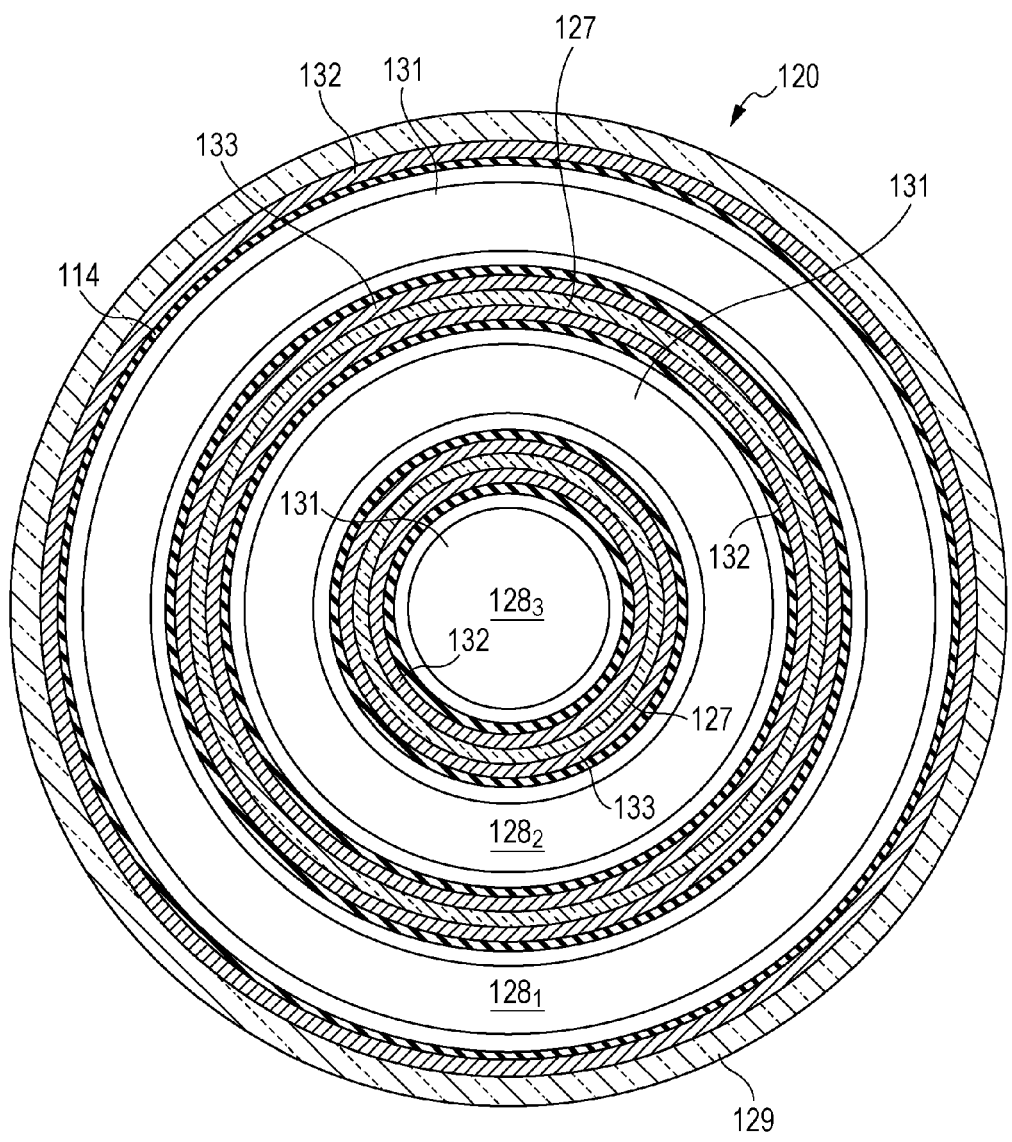
FIG. 17 is a schematic plan view of the liquid lens shown in FIG. 16.

A schematic cross-sectional view and a plan view of a liquid lens 120 of another configuration are shown in FIGS. 16 and 17, respectively. The liquid lens 120 is configured of a Fresnel lens and a ring-shaped lens chamber is arranged in the center thereof. In other words, the liquid lens 120 is provided with a housing that is provided with a so-called endless outer wall member 129 that does not have end portions, a top plate 125 that is attached to the top surface of the outer wall member 129, and a base plate 126 that is attached to the base surface of the outer wall member 129, and (N−1) partition wall members 127 that do not have end portions and are arranged to be aligned with the center of the outer wall member 129. Note that the outer shape of the housing is circular. The housing also includes a central lens chamber, which is surrounded by (N−1) ring-shaped lens chambers and the (N−1)th partition wall member 127. Here, in the example depicted, N=3. Each lens chamber 128 (128$_1$, 128$_2$ and 128$_3$) is filled with the first liquid 115 and the second liquid 116 that configure the liquid lens 120.

The first lens chamber (the ring-shaped lens chamber) 128$_1$ is configured of the outer wall member 129, the first partition wall member 127, the top plate 125 and the base plate 126. A first electrode (hereinafter referred to simply as a "first electrode 131") that configures the liquid lens 120 is provided on an inner surface of a portion of the top plate 125 that configures the first lens chamber 128$_1$, a second electrode (hereinafter referred to simply as a "second electrode 132") that configures the liquid lens 120 is provided on an inner surface of a portion of the outer wall member 129 that configures the first lens chamber 128$_1$, and a third electrode (hereinafter referred to simply as a "third electrode 133") that configures the liquid lens 120 is provided on an inner surface of a portion of the first partition wall member 127 that configures the first lens chamber 128$_1$.

The (n+1)th lens chamber (the ring-shaped lens chamber) 128$_{(n+1)}$ is configured of the n-th (where n=1, 2 . . . N−2) partition wall member 127, the (n+1)th partition wall member 127, the top plate 125 and the base plate 126. The first electrode 131 is provided on the inner surface of a portion of the top plate 125 that configures the (n+1)th lens chamber 128$_{(n+1)}$, the second electrode 132 is provided on the inner surface of a portion of the n-th partition wall member 127 that configures the (n+1)th lens chamber 128$_{(n+1)}$, and the third electrode 133 is provided on the inner surface of a portion of the (n+1)th partition wall member 127 that configures the (n+1)th lens chamber 128$_{(n+1)}$.

The first electrode 131 is provided on the inner surface of a portion of the top plate 125 that configures the central lens chamber 128$_3$, which is equivalent to the N-th lens chamber 128$_N$, and the third electrode 133 is provided on the inner surface of a portion of the (N−1)th partition wall member 127 that configures the central lens chamber 128$_3$.

Note that, in the depicted examples, the first electrodes 131 are provided for each of the lens chambers; however, one of the first electrodes 131 may be provided on the inner surface of the top plate 125.

In the liquid lens 120, the surfaces of each of the outer wall member 129 and the partition wall member 127, at which at least the interface between the first liquid 115 and the second liquid 116 is positioned, are subjected to hydrophobic treatment in the same manner as the liquid lens 100 described earlier. Light enters from the base plate 126 and light is emitted from the top plate 125. In each of the lens chambers 128$_1$, 128$_2$ and 128$_3$, the optical power of the liquid lens 120 is changed by causing the voltage applied to the second electrode 132 and the voltage applied to the third electrode 133 to be different. Alternatively, in each of the lens chambers 128$_1$, 128$_2$ and 128$_3$, a Fresnel lens is configured using the overall liquid lens by causing the voltage applied to the second electrode 132 and the voltage applied to the third electrode 133 to be different.

Example 2

Example 2 is a modification of Example 1 and relates to the display apparatus of the second embodiment. In the display apparatus of Example 2, the distance measuring sensor 60 measures the distance from the image forming device 40 to an external target object 23 that the observer 20 observes. The focal length of the lens 51 is controlled based on the distance that is measured by the distance measuring sensor 60. Specifically, as shown by the conceptual diagram in FIG. 5A, instead of the reflector 53 in the display apparatus of Example 1, another semi-transparent mirror (a second semi-transparent mirror 54) than the semi-transparent mirror 52 is arranged, and the distance measuring sensor 60 measures the distance from the image forming device 40, via the second semi-transparent mirror 54, to the external target object 23 that the observer 20 observes. Note that, the external target object 23 is positioned on the X axis. Except for the points described above, since it is possible to adopt the same configuration and structure as that of the display apparatus of Example 1 for the configuration and structure of the display apparatus of Example 2, detailed description thereof will be omitted. Note that, in the modification example of the display apparatus of Example 1 shown in FIGS. 2A and 2B, the second semi-transparent mirror 54 may be arranged between the lens 51 and the semi-transparent mirror 52.

Furthermore, the information relating to the external target object 23 that the observer 20 observes is displayed on the image forming device 40. After obtaining the image of the external target object 23 using the distance measuring sensor 60 (specifically, the distance measuring elements 61) or the imaging devices 71, the obtained image is analyzed in the control device (the control circuit) 18, the target object 23 is specified, and the information relating to the target object 23 that is stored in the control device (the control circuit) 18 may be displayed on the image forming device 40. By controlling the focal length of the lens 51, it is possible to cause the distance to the image (the virtual image) that is displayed by the image forming device 40 and that the observer observes, that is, the information relating to the external target object 23 to match (or substantially match) that of the external target object 23 that the observer 20 observes automatically without the observer 20 performing any operation. Since it is possible to combine the virtual image and real space in an interactive and smooth manner, there is no feeling of unnaturalness in the observation of the image.

Figure 6B:
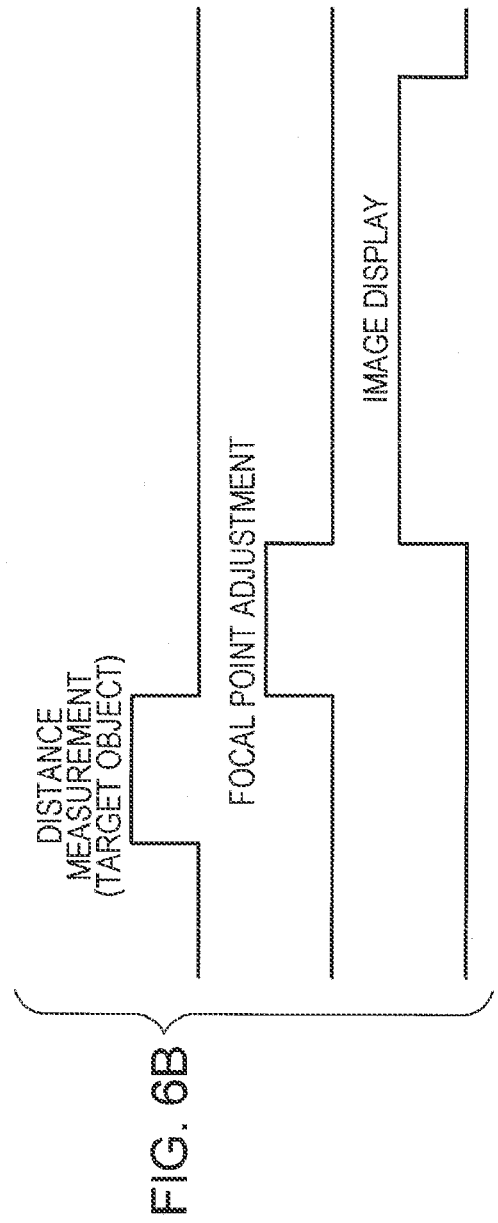

In FIG. 6B, a diagram for illustrating the operation of the display apparatuses of Example 2 is shown. It is preferable that the measurement of the distance to the target object 23 and the control of the focal length of the lens 51 be performed while the image is not being displayed on the image forming device 40.

In the display apparatus of Example 2, the distance measuring sensor 60 is provided on the inner portion of the image display unit of the image forming device 40. Accordingly, despite using a simple configuration and structure, it is possible to easily perform distance measurement to the external target object that the observer observes.

Example 3

Example 3 is a modification of Example 1 and relates to the display apparatus of the third embodiment. In the display apparatus of Example 3, the distance measuring sensor 60 performs detection of the viewpoint of the observer via the lens 51 and the semi-transparent mirror 52. In other words, the distance measuring sensor 60 detects where the viewpoint of the observer is placed in actual space. The distance from the image forming device 40 to the external target object 23 that the observer 20 observes is obtained based on the detected viewpoint of the observer 20. The focal length of the lens 51 is controlled based on the distance that is measured by the distance measuring sensor 60. Specifically, as shown by the conceptual diagram in FIG. 5B, instead of the reflector 53 in the display apparatus of Example 1, the second semi-transparent mirror 54 is arranged in the same manner as in the display apparatus of Example 2. The distance measuring sensor 60 performs detection of the viewpoint of the observer via the lens 51, the second semi-transparent mirror 54 and the semi-transparent mirror 52. The distance from the image forming device 40, via the second semi-transparent mirror 54 and the lens 51, to the external target object 23 that the observer 20 observes is obtained based on the detected viewpoint of the observer 20. Except for the points described above, since it is possible to adopt the same configuration and structure as that of the display apparatus of Example 1 for the configuration and structure of the display apparatus of Example 3, detailed description thereof will be omitted. Note that, in the modification example of the display apparatus of Example 1 shown in FIGS. 2A and 2B, the second semi-transparent mirror 54 may be arranged between the lens 51 and the semi-transparent mirror 52.

Furthermore, in the same manner as in Example 2, the information relating to the external target object 23 that the observer 20 observes is displayed on the image forming device 40. By controlling the focal length of the lens 51, it is possible to cause the distance to the image (the virtual image) that is displayed by the image forming device 40 and that the observer 20 observes, that is, the information relating to the external target object 23 to match (or substantially match) that of the external target object 23 that the observer 20 observes automatically without the observer 20 performing any operation. Since it is possible to combine the virtual image and real space in an interactive and smooth manner, there is no feeling of unnaturalness in the observation of the image.

In FIG. 7, a diagram for illustrating the operation of the display apparatuses of Example 3 is shown. First, by obtaining the distance to the surface of the eyeball of the observer 20 that is measured by the distance measuring sensor 60 and controlling the focal length of the lens 51, the focal point of the lens 51 is set to the surface of the eyeball. Next, using an existing method, the distance measuring sensor 60 performs detection of the viewpoint of the observer 20. Subsequently, the distance measuring sensor 60 measures the distance from the image forming device 40, via the lens 51 and the second semi-transparent mirror 54, to the external target object 23 that the observer 20 observes. After controlling the focal length of the lens 51, the image is displayed by the image forming device 40. In other words, the measurement of the distance to the eyeball of the observer 20, the detection of the viewpoint of the observer 20 and the measurement of the distance to the target object 23 are performed while the image is not being displayed on the image forming device 40.

Even in the display apparatus of Example 3, the distance measuring sensor 60 is provided on the inner portion of the image display unit of the image forming device 40. Accordingly, despite using a simple configuration and structure, it is possible to easily perform the detection of the viewpoint of the observer 20 and the distance measurement to the external target object 23 that the observer 20 observes.

Example 4

Example 4 is a modification of Example 1 to Example 3. In Example 4, predetermined information (for example, an input interface) is displayed on the image forming device 40. The predetermined information is displayed on a lower portion of the image display unit. Furthermore, the predetermined information is, for example, projected onto a virtual projection screen approximately 1 m in front of the observer 20. For the selection of the predetermined information (for example, an input), various processes may be performed based on the selected information, which is obtained by, for example, imaging a state in which the observer points using a finger at a virtual image that indicates the predetermined information using the imaging devices 71 and analyzing which of the predetermined information is selected in the control device (the control circuit) 18.

Example 5

Example 5 is a modification of Example 1 to Example 4. FIGS. 10A to 10H show conceptual diagrams of an image display unit of an image forming device that configures the display apparatus of Example 5. In the display apparatus of Example 5, light shielding members 47 are arranged between the light emitting diodes 43 and the distance measuring elements 61. The light shielding member 47 may be configured of a material that can prevent the incidence of the light that is emitted from the light emitting diodes 43 to the distance measuring elements 61. By providing the light shielding member 47 in this manner, the distance measuring elements 61 become difficult to be affected by the influence of the light emitting diodes 43.

Figure 10A:
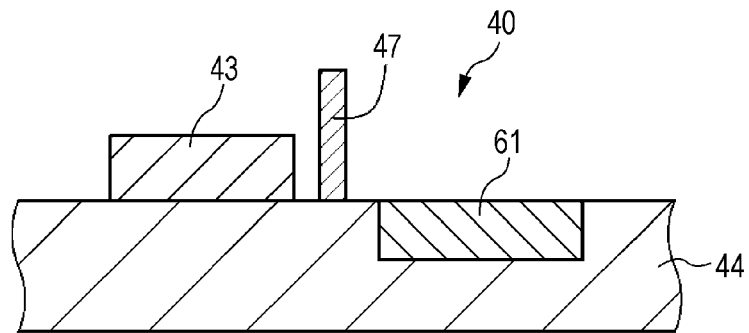
FIGS. 10A, 10B, 10C, and 10D are conceptual diagrams of an image display unit of an image forming device that configures the display apparatus of Example 5.
Figure 10B:
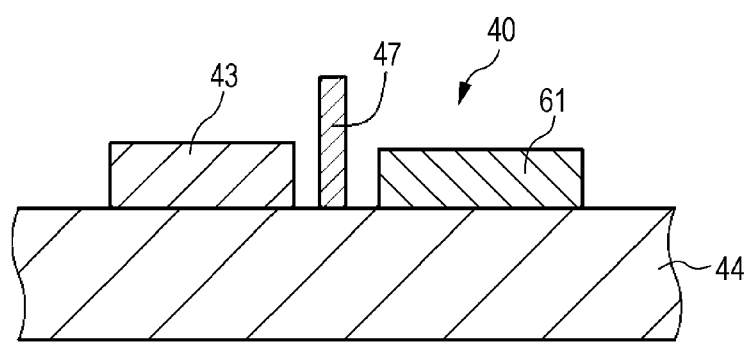

In the example shown in FIG. 10A, the distance measuring elements 61 are formed on the silicon semiconductor substrate 44, the light emitting diodes 43 are arranged on the silicon semiconductor substrate 44, and the light shielding members 47 are arranged between the distance measuring elements 61 and the light emitting diodes 43. In the example shown in FIG. 10B, the distance measuring elements 61 and the light emitting diodes 43 are arranged on the silicon semiconductor substrate 44, and the light shielding members 47 are arranged between the distance measuring elements 61 and the light emitting diodes 43.

Figure 10C:
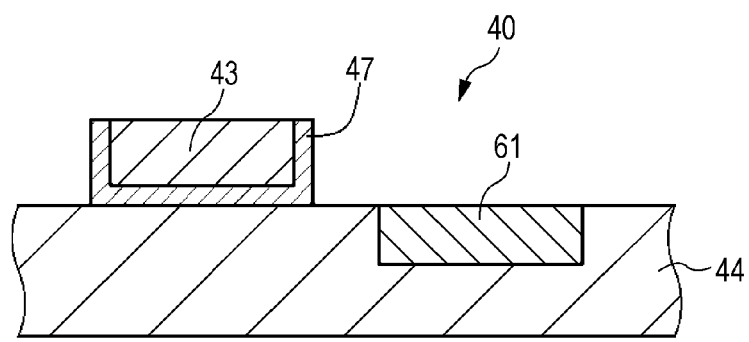
Figure 10D:
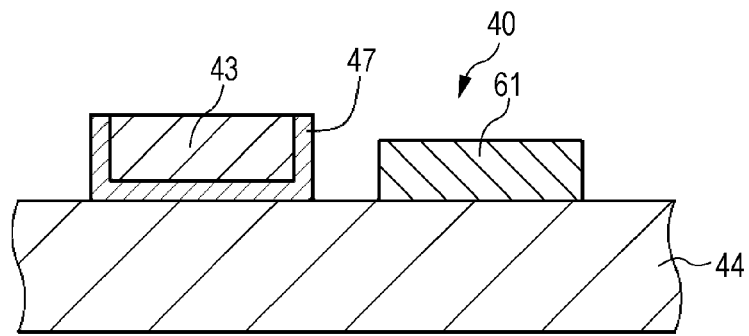

In the example shown in FIG. 10C, the distance measuring sensor 60 is formed on the silicon semiconductor substrate 44, the light emitting diodes 43 are arranged on the silicon semiconductor substrate 44, and the light shielding members 47 are provided on the outside of the light emitting diodes 43. In the example shown in FIG. 10D, the distance measuring sensor 60 and the light emitting diodes 43 are arranged on the silicon semiconductor substrate 44, and the light shielding members 47 are provided on the outside of the light emitting diodes 43. Note that, the light shielding member may be provided on each of the red light emitting sub-pixel 42R that is configured of a light emitting diode that emits red light, the green light emitting sub-pixel 42G that is configured of a light emitting diode that emits green light and the blue light emitting sub-pixel 42B that is configured of a light emitting diode that emits blue light. The light shielding member may also be provided in relation to the entirety of the three sub pixels 42R, 42G and 42B (one pixel).

Furthermore, the entirety of the distance measuring elements 61, the light emitting diodes 43 and the light shielding member 47 may be sealed. In Example 1 to Example 4, the entirety of the distance measuring elements 61 and the light emitting diodes 43 may be sealed.

Example 6

Figure 11A:
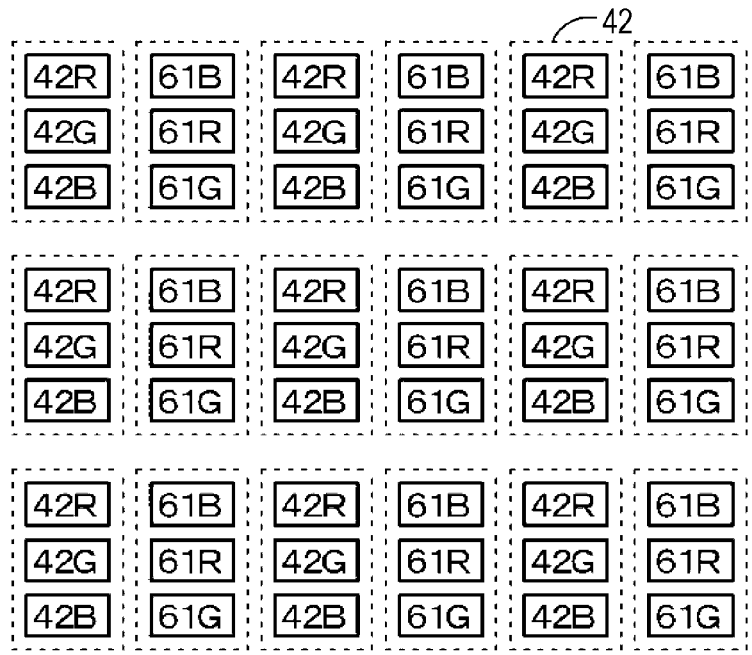
FIGS. 11A and 11B are schematic views for illustrating arrangement examples of pixels and distance measuring elements in a portion of the image display unit of the image forming device that configures the display apparatus of Example 6.
Figure 11B:

Example 6 is a modification of Example 1 to Example 5. FIGS. 11A and 11B schematically show arrangement examples of pixels and distance measuring elements in a portion of the image display unit of the image forming device that configures the display apparatus of Example 6. However, in Example 6, the light reception wavelength of the distance measuring elements 61 that are arranged adjacent to pixels is different from the light emission wavelength of the adjacent sub-pixel. Accordingly, it is possible to reduce optical crosstalk. Specifically, color filters may be arranged on the distance measuring elements 61. More specifically, a distance measuring element 61G or 61B that receives green or blue light may be provided adjacent to the red light emitting sub-pixel 42R, a distance measuring element 61R or 61B that receives red or blue light may be provided adjacent to the green light emitting sub-pixel 42G, and a distance measuring element 61R or 61G that receives red or green light may be provided adjacent to the blue light emitting sub-pixel 42B.

FIGS. 18A, 18B, 18C, 18D, 18E, and 18F show schematic partial cross-sectional views of image display units, according to some embodiments. As described above, in some embodiments of an image display unit, distance measuring sensors may be provided integrally with image forming devices. For just one example of a technique suitable for providing distance measuring sensors integrally with imaging forming devices, the reader is referred to Japanese Patent Application Publication No. 2010-73841.

Figure 18A:
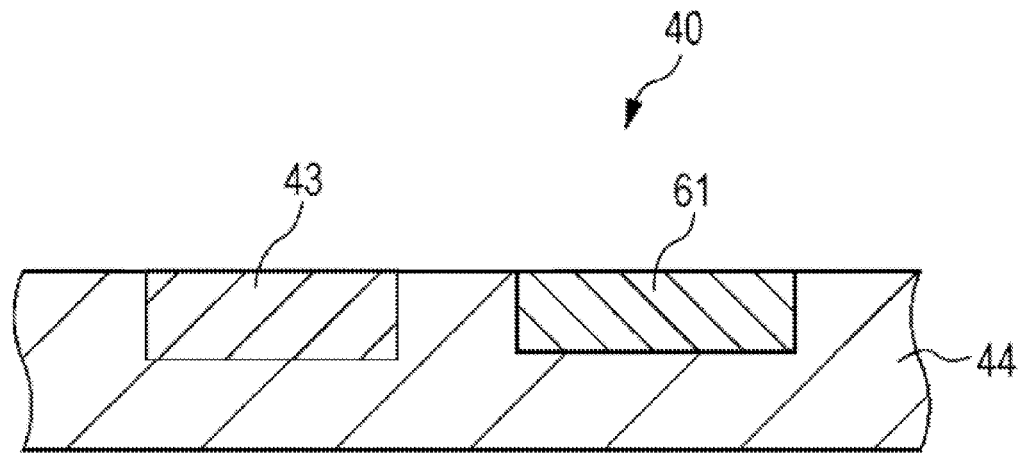
FIGS. 18A, 18B, 18C, 18D, 18E, and 18F are schematic partial cross-sectional views of image display units, according to some embodiments.

In FIG. 18A, the distance measuring sensors (e.g., distance measuring elements 61) are formed on the silicon semiconductor substrate 44, and the image forming devices (e.g., light emitting diodes 43) are formed on the silicon semiconductor substrate 44.

Figure 18B:
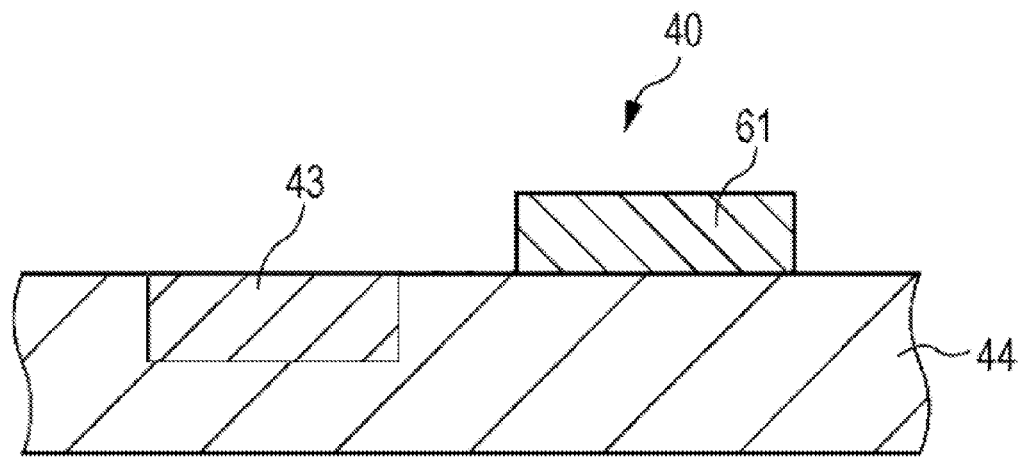

In FIG. 18B, the distance measuring sensors (e.g., distance measuring elements 61) are arranged on the silicon semiconductor substrate 44, and the image forming devices (e.g., light emitting diodes 43) are formed on the silicon semiconductor substrate 44.

Figure 18C:
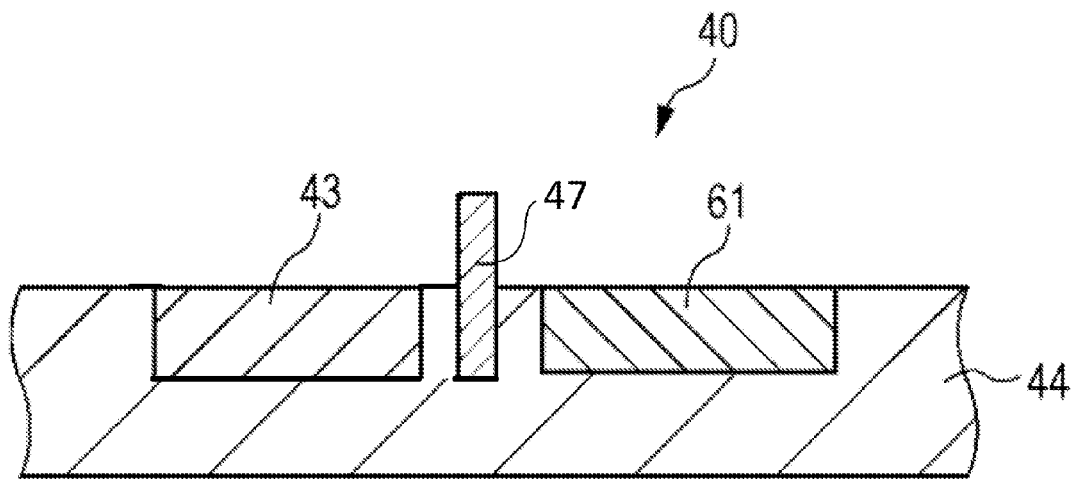

In FIG. 18C, the distance measuring sensors (e.g., distance measuring elements 61) are formed on the silicon semiconductor substrate 44, the image forming devices (e.g., light emitting diodes 43) are formed on the silicon semiconductor substrate 44, and the light shielding members 47 are disposed between the distance measuring sensors and the image forming devices.

Figure 18D:
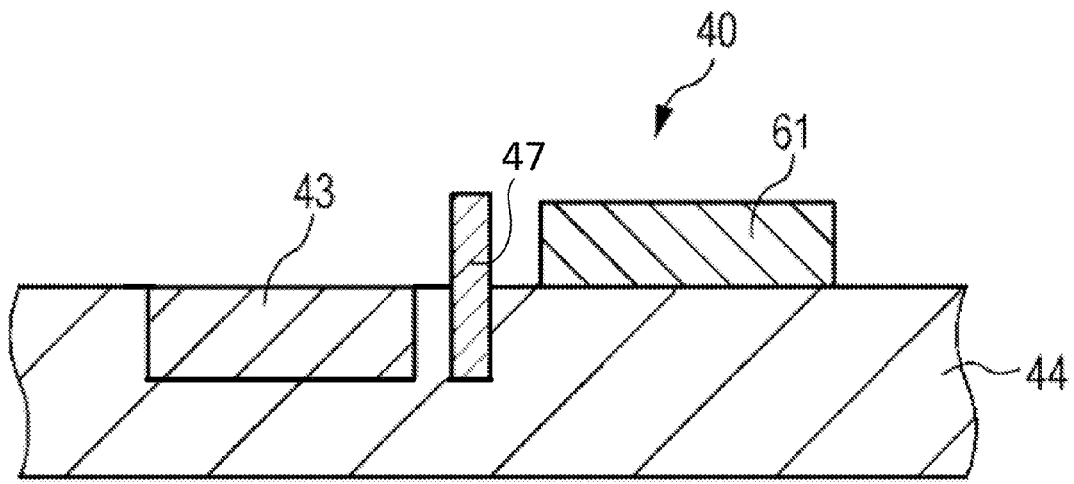

In FIG. 18D, the distance measuring sensors (e.g., distance measuring elements 61) are arranged on the silicon semiconductor substrate 44, the image forming devices (e.g., light emitting diodes 43) are formed on the silicon semiconductor substrate 44, and the light shielding members 47 are disposed between the distance measuring sensors and the image forming devices.

Figure 18E:
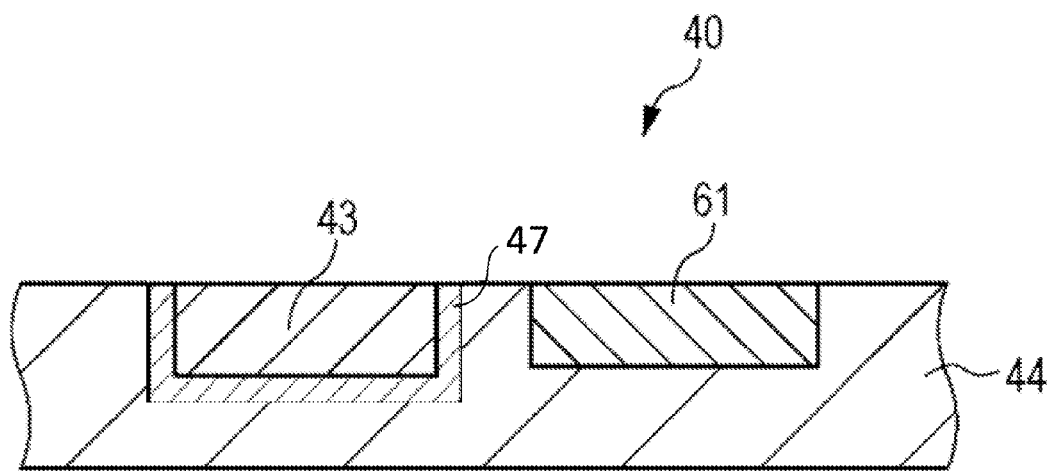

In FIG. 18E, the distance measuring sensors (e.g., distance measuring elements 61) are formed on the silicon semiconductor substrate 44, the image forming devices (e.g., light emitting diodes 43) are formed on the silicon semiconductor substrate 44, and the light shielding members are provided on the outsides of the image forming devices.

Figure 18F:
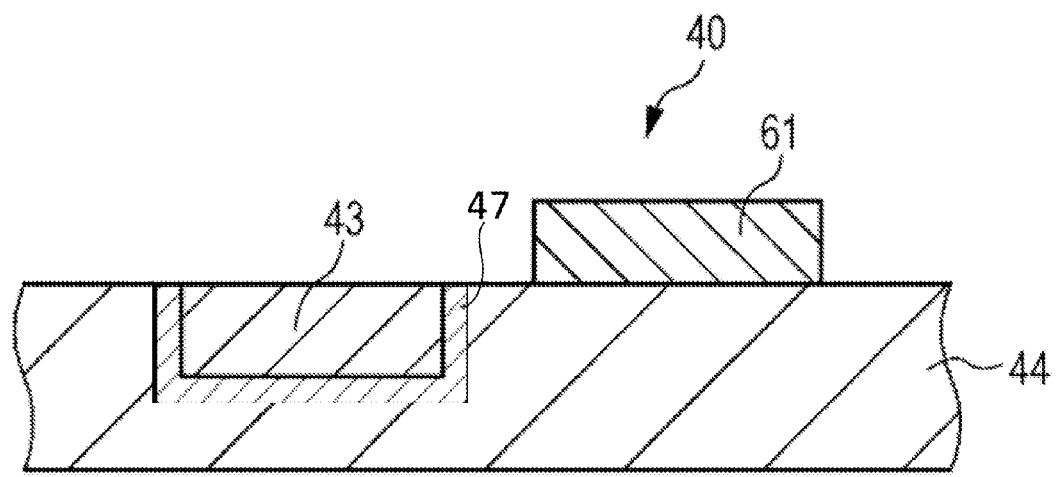

In FIG. 18F, the distance measuring sensors (e.g., distance measuring elements 61) are arranged on the silicon semiconductor substrate 44, the image forming devices (e.g., light emitting diodes 43) are formed on the silicon semiconductor substrate 44, and the light shielding members are provided on the outside of the image forming devices.

Description was given above of the preferred examples of the present disclosure. However, the present disclosure is not limited to the examples. The configurations and structures of the display apparatus (the head mounted display), the image display apparatus, the distance measuring sensor and the liquid lens that are described in the examples are merely examples, and it is possible to appropriately change the configurations and structures. The arrangements of the light emitting elements, the distance measuring sensor and the imaging devices are merely examples, and it is possible to appropriately change the arrangements. In some cases, it is possible to also use the distance measuring sensors as the imaging devices. In the examples, the light emitting elements that configure the image forming device 40 are all configured of light emitting diodes. However, the present disclosure is not limited thereto. For example, the light emitting elements can be configured of organic electroluminescence elements (organic EL elements), liquid crystal display elements or the like. In this case, the elements may be formed on an interlayer insulation layer, which is formed on a semiconductor substrate.

The present disclosure may adopt the following configurations.

(1) A head-mounted display system, comprising: a frame configured to be mounted to a head of a user; an imaging system configured to couple to the frame, the imaging system including: one or more display devices disposed on a substrate, and one or more sensors disposed on the substrate; and an optical system configured to provide an optical path between an eye of the user and the one or more sensors, and configured to provide the same optical path between the eye of the user and the one or more display devices.

(2) The head-mounted display system of (1), wherein at least one of the one or more sensors is disposed adjacent to at least one of the one or more display devices.

(3) The head-mounted display system according to any of (1) to (2), wherein at least one of the one or more sensors is disposed between a first of the display devices and a second of the display devices.

(4) The head-mounted display system according to any of (1) to (3), wherein the one or more sensors and the one or more display devices are provided integrally.

(5) The head-mounted display system according to any of (1) to (4), wherein the head-mounted display system is configured to control the one or more sensors to obtain data indicative of a distance between the substrate and the eye of the user.

(6) The head-mounted display system according to (5), wherein the head-mounted display system is configured to control the one or more sensors to obtain the data indicative of the distance between the substrate and the eye of the user while an image is displayed by the one or more display devices.

(7) The head-mounted display system according to any of (1) to (6), wherein the head-mounted display system is configured to control the one or more sensors to obtain data indicative of a distance between the substrate and an object external to the head-mounted display system.

(8) The head-mounted display system according to (7), wherein the head-mounted display system is configured to control the one or more sensors to obtain the data indicative of the distance between the substrate and the external object while no image is displayed by the one or more display devices.

(9) The head-mounted display system according to (7), wherein the optical system is configured to guide one or more images displayed by the one or more display devices toward the eye of the user based, at least in part, on the data indicative of the distance between the substrate and the object.

(10) The head-mounted display system according to (9), wherein the optical system comprises a lens, and wherein the optical system is configured to guide the one or more images based, at least in part, on the data indicative of the distance between the substrate and the object by changing a focal length of the lens based, at least in part, on the data indicative of the distance between the substrate and the object.

(11) The head-mounted display system according to (10), further comprising a control unit configured to change the focal length of the lens based, at least in part, on the data indicative of the distance between the substrate and the object while an image is displayed by the one or more display devices.

(12) The head-mounted display system according to (10), further comprising a control unit configured to change the focal length of the lens, wherein: the head-mounted display system is configured to control the one or more sensors to obtain data indicative of a distance between the substrate and the eye of the user, and the control unit is configured to change the focal length of the lens based, at least in part, on the data indicative of the distance between the substrate and the eye of the user, and on the data indicative of the distance between the substrate and the external object.

(13) The head-mounted display system according to any of (1) to (12), wherein the one or more sensors comprise at least one distance measuring sensor.

(14) The head-mounted display system according to any of (1) to (13), wherein the one or more sensors comprise at least one imaging device.

(15) The head-mounted display system according to any of (1) to (14), further comprising a light shielding member, wherein at least a portion of the light shielding member is disposed between a first of the one or more sensors and a first of the one or more display devices.

(16) The head-mounted display system according to any of (1) to (15), wherein at least one of the one or more sensors is formed on the substrate.

(17) A display method, comprising: providing an optical path between an eye of a user and one or more sensors disposed on a substrate of an imaging system coupled to a frame configured to be mounted to a head of the user, and providing the same optical path between the eye of the user and one or more display devices disposed on the substrate.

(18) The display method according to (17), further comprising: using the one or more display devices disposed on the substrate to display one or more images; using the one or more sensors disposed on the substrate to obtain data indicative of a distance between the substrate and an object; and guiding the one or more images displayed by the one or more display devices toward the eye of the user based, at least in part, on the data indicative of the distance between the substrate and the object.

(19) The display method according to (18), wherein guiding the one or more images displayed by the one or more display devices toward an eye of the user based, at least in part, on the data indicative of the distance between the substrate and the object comprises focusing the one or more images based, at least in part, on the data indicative of the distance between the substrate and the object.

(20) A display system, comprising: an imaging system configured to couple to a frame configured to be mounted to a head of a user, the imaging system including: one or more display devices disposed on a substrate, and one or more sensors disposed on the substrate; and an optical system configured to provide an optical path between an eye of the user and the one or more sensors, and configured to provide the same optical path between the eye of the user and the one or more display devices.

(21) A head-mounted display system, comprising: a frame configured to be mounted to a head of a user; an imaging system configured to couple to the frame, the imaging system including: one or more display devices disposed on a substrate, and one or more sensors disposed on the substrate; and an optical system configured to guide a part of light emitted by the display devices and configured to guide a part of light detected by the sensors.

(22) The display system according to (20), wherein at least one of the one or more display devices is formed on the substrate.

[A01] A display apparatus, including a frame to be mounted to a head of an observer; and an image display apparatus that is attached to the frame, in which the image display apparatus includes an image forming device, and an optical system that guides an image from the image forming device to a pupil of the observer, and in which a distance measuring sensor is provided on an inner portion of an image display unit of the image forming device.

[A02] The display apparatus according to [A01], in which the distance measuring sensor is configured to include a plurality of distance measuring elements, and in which the distance measuring elements are arranged between pixels of the image display unit of the image forming device.

[A03] The display apparatus according to [A01] or [A02], in which the optical system includes a lens into which an image from the image forming device is incident, and a semi-transparent mirror that reflects the image, after the image passes through the lens, and guides the image to the pupil of the observer.

[A04] The display apparatus according to [A03], in which the lens is formed of a liquid lens.

[A05] The display apparatus according to [A04], in which a focal length of the liquid lens is controlled based on a distance that is measured by the distance measuring sensor.

[B01] The display apparatus according to [A03] or [A04], in which the distance measuring sensor measures a distance from the image forming device, via the lens and the semi-transparent mirror, to a retina of the observer.

[B02] The display apparatus according to [B01], in which a focal length of the lens is controlled based on the distance that is measured by the distance measuring sensor.

[B03] The display apparatus according to [B01] or [B02], in which, by controlling the focal length of the lens, an image that is displayed by the image forming device is caused to reach the observer in a focused state.

[B04] The display apparatus according to any of [B01] to [B03], in which the measurement of the distance to the retina of the observer is performed while the image is being displayed on the image forming device.

[C01] The display apparatus according to [A03] or [A04], in which the distance measuring sensor measures a distance from the image forming device to an external target object that the observer observes.

[C02] The display apparatus according to [C01], in which the optical system is further provided with a second semi-transparent mirror between the lens and the semi-transparent mirror.

[C03] The display apparatus according to [C01] or [C02], in which a focal length of the lens is controlled based on the distance that is measured by the distance measuring sensor.

[C04] The display apparatus according to any of [C01] to [C03], in which information relating to the external target object that the observer observes is displayed on the image forming device.

[C05] The display apparatus according to any of [C01] to [C04], in which, by controlling the focal length of the lens, the distance to a virtual image that the observer observes, that is, the image that is displayed by the image forming device is caused to match, or to substantially match, that of the external target object that the observer observes.

[C06] The display apparatus according to any of [C01] to [C05], in which the measurement of the distance to the target object is performed while the image is not being displayed on the image forming device.

[D01] The display apparatus according to [A03] or [A04], in which the distance measuring sensor performs detection of a viewpoint of the observer via the lens and the semi-transparent mirror, and obtains a distance from the image forming device to an external target object that the observer observes based on the viewpoint of the observer that is detected.

[D02] The display apparatus according to [D01], in which the optical system is further provided with a second semi-transparent mirror between the lens and the semi-transparent mirror.

[D03] The display apparatus according to [D01] or [D02], in which a focal length of the lens is controlled based on the distance that is measured by the distance measuring sensor.

[D04] The display apparatus according to any of [D01] to [D03], in which information relating to the external target object that the observer observes is displayed on the image forming device.

[D05] The display apparatus according to any of [D01] to [D04], in which, by controlling the focal length of the lens, the distance to the virtual image that the observer observes, that is, the image that is displayed by the image forming device is caused to match, or to substantially match, that of the external target object that the observer observes.

[D06] The display apparatus according to any of [D01] to [D05], in which the detection of the viewpoint of the observer and the measurement of the distance to the target object are performed while the image is not being displayed on the image forming device.

[D07] The display apparatus according to any of [D01] to [D06], in which, before performing detection of the viewpoint of the observer, the distance measuring sensor measures the distance from the image forming device, via the lens and the semi-transparent mirror, to the surface of an eyeball of the observer, and subsequently, the focal length of the lens is controlled based on the distance to the surface of the eyeball that is measured by the distance measuring sensor.

[D08] The display apparatus according to [D07], in which the measurement of the distance to the surface of the eyeball of the observer is performed before the detection of the viewpoint of the observer, while the image is not being displayed on the image forming device.

[E01] The display apparatus according to any of [A01] to [D08], in which predetermined information is displayed on the image forming device.

[E02] The display apparatus according to [E01], in which the predetermined information is displayed on a lower portion of the image display unit.

[E03] The display apparatus according to any of [A01] to [E02], in which the image forming device is formed by arranging a plurality of light emitting diodes in a two-dimensional matrix shape.

[E04] The display apparatus according to [E03], in which light shielding members are arranged between the light emitting diodes and the distance measuring elements that configure the distance measuring sensor.

[E05] The display apparatus according to any of [A01] to [E04], in which the light reception wavelength of the distance measuring elements that are provided adjacent to the pixels is different from the light emission wavelength of the adjacent pixels.

In some embodiments, an "imaging system" may comprise an "image forming device" 40. In some embodiments, a "display device" may comprise a "light emitting element." In some embodiments, a "sensor" may comprise a "distance measuring sensor" 60 and/or an "imaging device" 71.

It should be understood by those skilled in the art that various modifications, combinations, sub-combinations and alterations may occur depending on design requirements and other factors insofar as they are within the scope of the appended claims or the equivalents thereof.

What is claimed is:

1. A head-mounted display system, comprising:
   a frame configured to be mounted to a head of a user;
   an imaging system configured to couple to the frame, the imaging system including: display devices disposed on a substrate, and distance measuring sensors disposed on the substrate; and
   an optical system configured to provide an optical path between an eye of the user and the distance measuring sensors, and configured to provide the same optical path between the eye of the user and the display devices, wherein the display devices are arranged on the substrate in a two-dimensional matrix and the distance measuring sensors are arranged on the substrate between respective ones of the display devices, wherein the head-mounted display system is configured to control the distance measuring sensors to obtain data indicative of a distance between the substrate and the eye of the user, wherein the optical system includes a lens and wherein the head-mounted display system is configured to control the distance measuring sensors to obtain an image of a retina of the eye of the user and to control the focal length of the lens such that the obtained image of the retina is in a focused state.

2. The head-mounted display system of claim 1, wherein at least one of the distance measuring sensors is disposed adjacent to at least one of the display devices.

3. The head-mounted display system of claim 1, wherein the distance measuring sensors and the display devices are provided integrally.

4. The head-mounted display system of claim 1, wherein the head-mounted display system is configured to control the distance measuring sensors to obtain the data indicative of the distance between the substrate and the eye of the user while an image is displayed by the display devices.

5. The head-mounted display system of claim 1, wherein the head-mounted display system is configured to control the distance measuring sensors to obtain data indicative of a distance between the substrate and an object external to the head-mounted display system.

6. The head-mounted display system of claim 5, wherein the head-mounted display system is configured to control the distance measuring sensors to obtain the data indicative of the distance between the substrate and the external object while no image is displayed by the display devices.

7. The head-mounted display system of claim 5, wherein the optical system is configured to guide one or more images displayed by the display devices toward the eye of the user based, at least in part, on the data indicative of the distance between the substrate and the object.

8. The head-mounted display system of claim 7, wherein the optical system is configured to guide the one or more images based, at least in part, on the data indicative of the distance between the substrate and the object by changing a focal length of the lens based, at least in part, on the data indicative of the distance between the substrate and the object.

9. The head-mounted display system of claim 8, further comprising a control unit configured to change the focal length of the lens based, at least in part, on the data indicative of the distance between the substrate and the object while an image is displayed by the display devices.

10. The head-mounted display system of claim 8, further comprising a control unit configured to change the focal length of the lens, wherein:
    the head-mounted display system is configured to control the distance measuring sensors to obtain data indicative of a distance between the substrate and the eye of the user, and
    the control unit is configured to change the focal length of the lens based, at least in part, on the data indicative of the distance between the substrate and the eye of the user, and on the data indicative of the distance between the substrate and the external object.

11. The head-mounted display system of claim 1, wherein the distance measuring sensors comprise at least one imaging device.

12. The head-mounted display system of claim 1, further comprising a light shielding member, wherein at least a portion of the light shielding member is disposed between a first of the distance measuring sensors and a first of the display devices.

13. A display method, comprising:
    providing, by an optical system, an optical path between an eye of a user and distance measuring sensors disposed on a substrate of an imaging system coupled to a frame configured to be mounted to a head of the user, and
    providing, by the optical system, the same optical path between the eye of the user and one or more display devices disposed on the substrate, wherein the display devices are arranged on the substrate in a two-dimensional matrix and the distance measuring sensors are arranged on the substrate between respective ones of the display devices and wherein the distance measuring sensors are controlled to obtain data indicative of a distance between the substrate and the eye of the user, wherein the optical system includes a lens, further comprising controlling the distance measuring sensors to obtain an image of a retina of the eye of the user and controlling the focal length of the lens such that the obtained image of the retina is in a focused state.

14. The display method of claim 13, further comprising:
    using the display devices disposed on the substrate to display one or more images;
    using the distance measuring sensors disposed on the substrate to obtain data indicative of a distance between the substrate and an object; and
    guiding the one or more images displayed by the display devices toward the eye of the user based, at least in part, on the data indicative of the distance between the substrate and the object.

15. A display system, comprising:
    an imaging system configured to couple to a frame configured to be mounted to a head of a user, the imaging system including: display devices disposed on a substrate, and distance measuring sensors disposed on the substrate; and
    an optical system configured to provide an optical path between an eye of the user and the distance measuring sensors, and configured to provide the same optical path between the eye of the user and the display devices, wherein the display devices are arranged on the substrate in a two-dimensional matrix and the distance measuring sensors are arranged on the substrate between respective ones of the display devices, wherein the display system is configured to control the distance measuring sensors to obtain data indicative of a distance between the substrate and the eye of the user, wherein the optical system includes a lens and wherein the head-mounted display system is configured to control the distance measuring sensors to obtain an image of a retina of the eye of the user and to control the focal length of the lens such that the obtained image of the retina is in a focused state.

16. A head-mounted display system, comprising:
a frame configured to be mounted to a head of a user;
an imaging system configured to couple to the frame, the imaging system including:
   display devices disposed on a substrate, and
   distance measuring sensors disposed on the substrate; and
an optical system configured to guide a part of light emitted by the display devices and configured to guide a part of light detected by the sensors, wherein the display devices are arranged on the substrate in a two-dimensional matrix and the distance measuring sensors are arranged on the substrate between respective ones of the display devices, wherein the head-mounted display system is configured to control the distance measuring sensors to obtain data indicative of a distance between the substrate and the eye of the user, wherein the optical system includes a lens and wherein the head-mounted display system is configured to control the distance measuring sensors to obtain an image of a retina of the eye of the user and to control the focal length of the lens such that the obtained image of the retina is in a focused state.

* * * * *